US 9,825,855 B2

(12) United States Patent
Sugiyama et al.

(10) Patent No.: US 9,825,855 B2
(45) Date of Patent: Nov. 21, 2017

(54) INFORMATION PROCESSING APPARATUS AND ROUTE SETTING METHOD

(71) Applicant: FUJITSU LIMITED, Kawasaki-shi, Kanagawa (JP)

(72) Inventors: Taichi Sugiyama, Kawasaki (JP); Takeshi Yasuie, Kawasaki (JP); Yuji Nomura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 421 days.

(21) Appl. No.: 14/249,178

(22) Filed: Apr. 9, 2014

(65) Prior Publication Data

US 2015/0003457 A1    Jan. 1, 2015

Related U.S. Application Data

(63) Continuation of application No. PCT/JP2011/073786, filed on Oct. 17, 2011.

(51) Int. Cl.
| | |
|---|---|
| *H04L 12/741* | (2013.01) |
| *H04L 12/751* | (2013.01) |
| *H04L 12/721* | (2013.01) |
| *H04L 12/733* | (2013.01) |
| *H04L 12/24* | (2006.01) |

(Continued)

(52) U.S. Cl.
CPC .......... *H04L 45/74* (2013.01); *H04L 41/0816* (2013.01); *H04L 45/025* (2013.01); *H04L 45/122* (2013.01); *H04L 45/72* (2013.01); *H04L 41/0213* (2013.01); *H04L 41/0893* (2013.01);

(Continued)

(58) Field of Classification Search
None
See application file for complete search history.

(56) References Cited

U.S. PATENT DOCUMENTS 4,745,593 A    5/1988   Stewart
2004/0246991 A1*  12/2004   Tsuzuki ............ H04L 29/12358
                                               370/466

(Continued)

FOREIGN PATENT DOCUMENTS

| CA | 1282478 | 4/1991 |
|---|---|---|
| JP | 2-501019 | 4/1990 |

(Continued)

OTHER PUBLICATIONS

Patent Abstracts of Japan, Publication No. 11-220487, Published Aug. 10, 1999.

(Continued)

*Primary Examiner* — Duc Duong
(74) *Attorney, Agent, or Firm* — Staas & Halsey LLP

(57) ABSTRACT

An information processing apparatus includes a processor configured to perform a process which includes determining an address available to be set as a source address of a first packet to be transmitted to an apparatus included in a network; identifying one or more relay apparatuses in a communication route from the apparatus to the information processing apparatus; and configuring, for at least one of the identified relay apparatuses, a setting regarding a transfer destination of a second packet whose destination address is the determined address in such a manner that the second packet is transferred toward the information processing apparatus along the communication route.

9 Claims, 21 Drawing Sheets

(51) Int. Cl.
   *H04L 29/12*  (2006.01)
   *H04L 12/26*  (2006.01)
(52) U.S. Cl.
   CPC .............. *H04L 43/10* (2013.01); *H04L 43/50* (2013.01); *H04L 61/6068* (2013.01)

(56) References Cited

U.S. PATENT DOCUMENTS

| | | | | |
|---|---|---|---|---|
| 2006/0239199 | A1* | 10/2006 | Blair | H04L 45/54 370/248 |
| 2007/0280244 | A1* | 12/2007 | Kikuchi | H04L 43/0811 370/392 |
| 2008/0137543 | A1* | 6/2008 | Mitra | H04L 43/50 370/242 |
| 2008/0205388 | A1* | 8/2008 | Colville | H04L 45/26 370/389 |
| 2008/0225888 | A1* | 9/2008 | Valluri | H04L 67/02 370/466 |
| 2009/0168655 | A1* | 7/2009 | Yamazaki | H04L 12/2697 370/241.1 |
| 2009/0190482 | A1* | 7/2009 | Blair | H04L 43/0858 370/250 |
| 2010/0014521 | A1* | 1/2010 | Tamura | H04L 29/12254 370/392 |
| 2012/0163191 | A1* | 6/2012 | Tokimizu | H04L 12/569 370/242 |

FOREIGN PATENT DOCUMENTS

| | | |
|---|---|---|
| JP | 11-220487 | 8/1999 |
| JP | 2000-253008 | 9/2000 |
| JP | 2002-344448 | 11/2002 |
| JP | 2006-119867 | 5/2006 |
| WO | WO 88/04120 | 6/1988 |

OTHER PUBLICATIONS

Patent Abstracts of Japan, Publication No. 2000-253008, Published Sep. 14, 2000.
Patent Abstracts of Japan, Publication No. 2006-119867, Published May 11, 2006.
Notice of Publication of EP 0 387 244, published as WO 88/04120 (AF).
International Search Report for PCT/JP2011/073786, mailed Jan. 10, 2012.
Patent Abstracts of Japan, Publication No. 2002-344448; Published on Nov. 29, 2002.
Japanese Office Action mailed Nov. 25, 2014 in corresponding Japanese Patent Application No. 2013-539423.

* cited by examiner

112 OPERATING-SYSTEM PACKET INFORMATION STORAGE UNIT

112a OPERATING-SYSTEM PACKET MANAGEMENT TABLE

| SESSION ID | TIME | SA | DA | SP | DP | SEQUENCE NUMBER | ACK NUMBER | SYN | ACK | PSH | FIN | RST | HEADER | MESSAGE BODY |
|---|---|---|---|---|---|---|---|---|---|---|---|---|---|---|
| abc | 2.1 | 192.168.10.10 | 20.20.20.20 | 2000 | 80 | 10001 | 5001 | – | 1 | 1 | – | – | GET | |
| abc | 2.3 | 20.20.20.20 | 192.168.10.10 | 80 | 2000 | 5001 | 14001 | – | 1 | – | – | – | 200 OK | |
| abc | 2.4 | 192.168.10.10 | 20.20.20.20 | 2000 | 80 | 14001 | 7001 | – | 1 | – | – | – | POST | |
| abc | 2.6 | 20.20.20.20 | 192.168.10.10 | 80 | 2000 | 7001 | 14001 | – | 1 | 1 | – | – | 200 OK | |

FIG. 7

116 VERIFICATION-SYSTEM PACKET INFORMATION STORAGE UNIT

116a VERIFICATION-SYSTEM PACKET MANAGEMENT TABLE

| SESSION ID | TIME | SA | DA | SP | DP | SEQUENCE NUMBER | ACK NUMBER | SYN | ACK | PSH | FIN | RST | HEADER | MESSAGE BODY |
|---|---|---|---|---|---|---|---|---|---|---|---|---|---|---|
| ijk | 2.1 | 10.10.20.10 | 20.20.20.80 | 9000 | 80 | 10001 | 11001 | - | 1 | 1 | - | - | GET | |
| ijk | 2.3 | 20.20.20.80 | 10.10.10.10 | 80 | 9000 | 11001 | 14001 | - | 1 | - | - | - | 200 OK | |
| ijk | 2.4 | 10.10.20.10 | 20.20.20.80 | 9000 | 80 | 14001 | 13001 | - | 1 | 1 | - | - | POST | |
| ijk | 2.6 | 20.20.20.80 | 10.10.10.10 | 80 | 9000 | 13001 | 14001 | - | 1 | - | - | - | 200 OK | |

FIG. 11

INFORMATION PROCESSING APPARATUS AND ROUTE SETTING METHOD

CROSS-REFERENCE TO RELATED APPLICATION

This application is a continuation application of International Application PCT/JP2011/073786 filed on Oct. 17, 2011 which designated the U.S., the entire contents of which are incorporated herein by reference.

FIELD

The embodiments discussed herein are related to an information processing apparatus for configuring settings for relaying apparatuses.

BACKGROUND

In a computer system, performance tests are conducted in a variety of situations. For example, when a server program is updated, a performance test such as a regression test is carried out. In the case of conducting a performance test of a program to be installed in a system in operation (actual operating system), for example, a system for verification (verification system) having the same configuration as the actual operating system is prepared. Then, a performance test of the verification system is carried out by sending verification data to the verification system.

As for a technology for creating verification data, there has been proposed, for example, a simulation test apparatus configured to receive verification data from a monitoring apparatus that monitors a transmission channel and transmit the verification data to an actual apparatus connected to the transmission channel or a simulation apparatus that represents the actual apparatus in a simulation environment. The simulation test apparatus converts a destination address of the verification data addressed to the actual apparatus into an address of the simulation apparatus, and also converts a source address of reply data sent from the simulation apparatus into the destination address before the conversion.

Japanese Laid-open Patent Publication No. 11-220487

In the case where a verification system includes, as its system components, relay apparatuses for relaying packets, route settings are configured for the relay apparatuses in such a manner that a reply to each packet including verification data is transferred to an apparatus for conducting performance verification (verification apparatus).

However, a setting of a packet transfer destination for each of the relay apparatuses is configured based on an operation, for example, by a system administrator, and therefore causes the workload for the system administrator. For example, there is a case where the verification apparatus selects, from an address block prepared in advance (pool address block), an address to be used as a source address when a packet is transferred. The address block is an address group made up of a plurality of addresses. In this case, the administrator needs to configure settings for the relay apparatuses in such a manner that a packet directed to the address used by the verification apparatus as the packet source address is transferred to the verification apparatus, and thus the workload of the administrator is increased. Further, as the size of the verification-system network increases, the number of relay apparatuses in the network also increases, resulting in increased workload involved in the route settings.

SUMMARY

According to one embodiment, there is provided a non-transitory computer-readable storage medium storing a computer program causing a computer to perform a process which includes determining an address available to be set as a source address of a first packet to be transmitted to an apparatus included in a network; identifying one or more relay apparatuses in a communication route from the apparatus to the computer; and configuring, for at least one of the identified relay apparatuses, a setting regarding a transfer destination of a second packet whose destination address is the determined address in such a manner that the second packet is transferred toward the computer along the communication route.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of a data structure of an operating-system packet information storing unit;

FIG. 11 illustrates an example of a data structure of a verification-system packet information storing unit;

DESCRIPTION OF EMBODIMENTS

Figure 1:
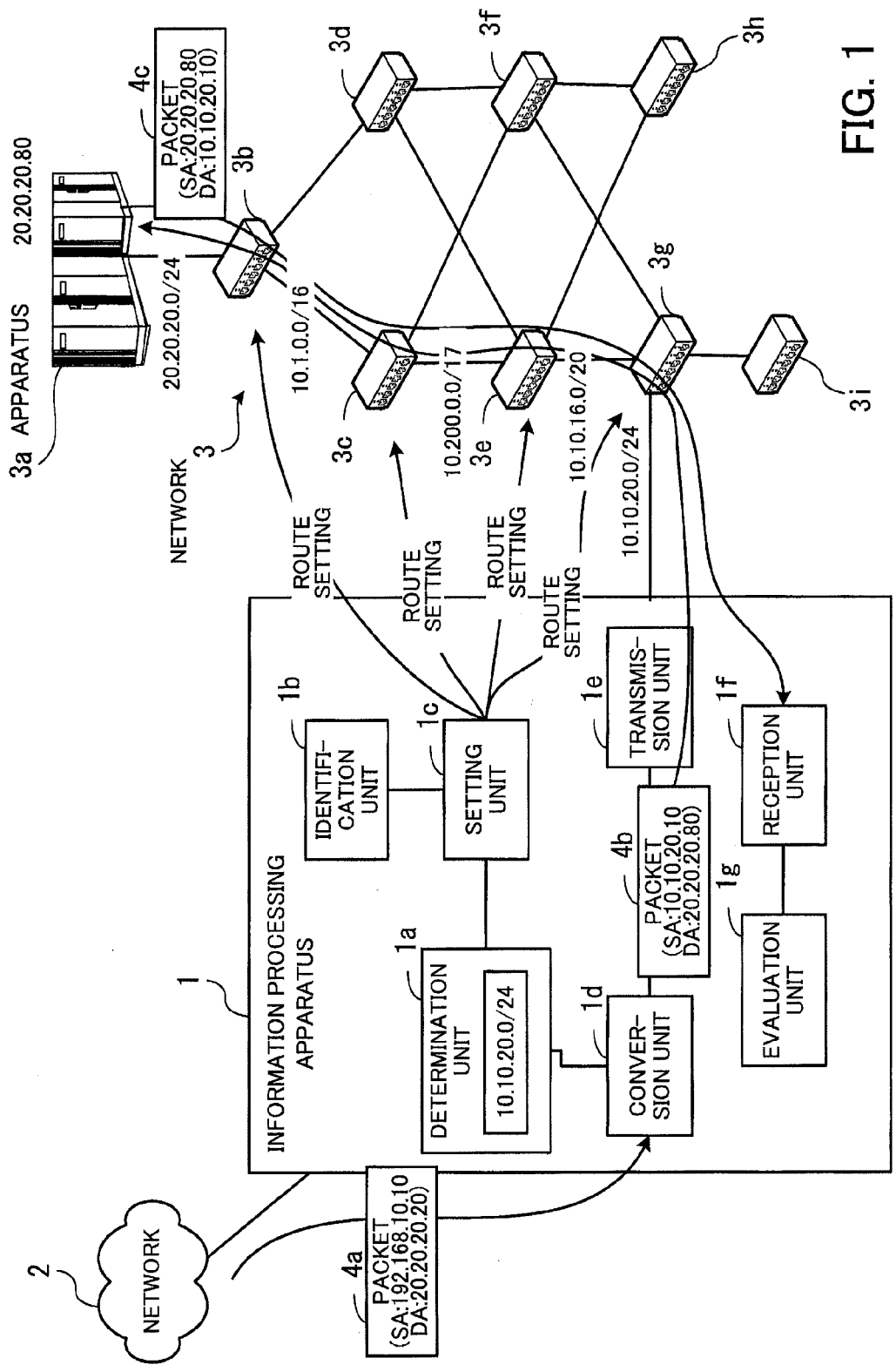
FIG. 1 illustrates an example of a functional configuration of a system according to a first embodiment.

Several embodiments will be described below with reference to the accompanying drawings, wherein like reference numerals refer to like elements throughout. Note that two or more of the embodiments below may be combined for implementation in such a way that no contradiction arises.

(a) First Embodiment

FIG. 1 illustrates an example of a functional configuration of a system according to a first embodiment. An information processing apparatus 1 is provided, for example, between networks 2 and 3. The network 3 includes an apparatus 3a and a plurality of relay apparatuses 3b, 3c, 3d, 3e, 3f, 3g, 3h, and 3i. According to the example of FIG. 1, the apparatus 3a has an address of 20.20.20.80. A subnetwork between the relay apparatus 3b and the apparatus 3a has an address of 20.20.20.0/24. A subnetwork between the relay apparatuses 3b and 3c has an address of 10.1.0.0/16. A subnetwork between the relay apparatuses 3c and 3e has an address of 10.200.0.0/17. A subnetwork between the relay apparatuses 3e and 3g has an address of 10.10.16.0/20. Note that a communication route of packets whose destination address is 20.20.20.80 of the apparatus 3a is preliminarily configured for each of the relay apparatuses 3b, 3c, 3d, 3e, 3f, 3g, 3h, and 3i.

According to the first embodiment, the information processing apparatus 1 identifies relay apparatuses on a prospective communication route from the apparatus 3a to the information processing apparatus 1. Next, as for a setting regarding a transfer destination of a reply packet to be returned from the apparatus 3a in response to a packet transmitted to the apparatus 3a, the information processing apparatus 1 configures the setting for each of the identified relay apparatuses in such a manner that the reply packet is transferred to the information processing apparatus 1 along the communication route. In order to implement such processing, the information processing apparatus 1 includes a determination unit 1a, an identification unit 1b, a setting unit 1c, a conversion unit 1d, a transmission unit 1e, a reception unit 1f, and an evaluation unit 1g.

The determination unit 1a determines an address available to be set as a source address of a packet to be transmitted to the apparatus 3a of the network 3. For example, the determination unit 1a determines a plurality of addresses assembled into an address block as addresses available to be set as a source address of each packet.

The identification unit 1b identifies, within the network 3, the relay apparatuses 3b, 3c, 3e, and 3g in a communication route from the apparatus 3a to the information processing apparatus 1. Note here that the communication route in which the relay apparatuses are identified is, among routes available for communication between the apparatus 3a and the information processing apparatus 1, a potential communication route for actual use. If a failure or the like occurs in the communication route, a different one may be used for the communication instead. The identification unit 1b uses, for example, a trace route command to thereby identify an address of each of the relay apparatuses 3b, 3c, 3e, and 3g in the communication route between the information processing apparatus 1 and the apparatus 3a.

As for a setting regarding transfer of a packet whose destination address is the determined address, the setting unit 1c configures the setting for at least one of the identified relay apparatuses 3b, 3c, 3e, and 3g in such a manner that the packet is transferred toward the information processing apparatus 1 along the communication route. For example, the setting unit 1c configures such settings for all the identified relay apparatuses 3b, 3c, 3e, and 3g. Note that there is a case where a plurality of addresses assembled into an address block are determined as addresses available to be set as a source address of each packet. In this case, the setting unit 1c configures a setting regarding transfer of packets whose destination addresses are individually one of the addresses included in the address block in such a manner that the packets are transferred toward the information processing apparatus 1 along the communication route.

The conversion unit 1d converts a destination address of a packet 4a acquired from the network 2 to the address of the apparatus 3a, and also converts a source address of the packet 4a to the determined address. The transmission unit 1e transmits a packet 4b formed after the address conversion to the apparatus 3a of the network 3. The reception unit 1f receives a packet 4c replied from the apparatus 3a in response to the packet 4b transmitted to the apparatus 3a. The evaluation unit 1g evaluates the performance of the apparatus 3a based on the received packet 4c. Note in FIG. 1 that the source address and the destination address of each of the packets 4a, 4b, and 4c are denoted as SA (source address) and DA (destination address), respectively.

The determination unit 1a, the identification unit 1b, the setting unit 1c, the conversion unit 1d, the transmission unit 1e, the reception unit 1f, and the evaluation unit 1g of FIG. 1 may be implemented by a central processing unit (CPU) of the information processing apparatus 1. Note also that, in FIG. 1, each line connecting the individual components represents only a part of the communication relationships, and communication relationships other than the one illustrated in FIG. 1 are also configurable.

According to the system illustrated in FIG. 1, first, the determination unit 1a determines addresses available to be set as a source address of each packet to be transmitted to the apparatus 3a of the network 3. In the example of FIG. 1, addresses included in an address block represented by 10.10.20.0/24 are determined as the assignable addresses. Of the address 10.10.20.0/24, '10.10.20.0' represents a subnetwork address, and '/24' is the number of bits of the network address portion. In this case, addresses in the range from 10.10.20.1 to 10.10.20.224 are available to be set as source addresses of packets transmitted to the apparatus 3a. Note that because 10.10.20.0 is an address indicating the subnetwork, it is not to be set as a source address of a packet transmitted to the apparatus 3a. In addition, 10.10.20.255 is a broadcast address, and it is therefore not to be set as a source address of a packet transmitted to the apparatus 3a.

Next, the identification unit 1b identifies the relay apparatuses 3b, 3c, 3e, and 3g in the communication route from the apparatus 3a to the information processing apparatus 1. Subsequently, the setting unit 1c configures, for at least one of the identified relay apparatuses 3b, 3c, 3e, and 3g, a setting regarding transfer of packets whose destination addresses are individually one of the determined addresses in such a manner that the packets are transferred toward the information processing apparatus 1 along the communication route.

In the example of FIG. 1, the setting regarding packet transfer destinations is configured for each of the identified relay apparatuses 3b, 3c, 3e, and 3g. For example, with the setting, the relay apparatus 3b is configured to transfer, toward an interface connected to the relay apparatus 3c, packets with destination addresses each corresponding to one of the addresses included in the address block 10.10.20.0/24. Similarly, with the setting, the relay apparatus 3c is configured to transfer, toward an interface connected to the relay apparatus 3e, packets with destination addresses each corresponding to one of the addresses included in the address block 10.10.20.0/24. With the setting, the relay apparatus 3e is configured to transfer, toward an interface connected to the relay apparatus 3g, packets with destination addresses each corresponding to one of the addresses included in the address block 10.10.20.0/24. With the setting, the relay apparatus 3g is configured to transfer, toward an interface to which the information processing apparatus 1 is connected, packets with destination addresses each corresponding to one of the addresses included in the address block 10.10.20.0/24.

Then, the conversion unit 1d converts the addresses of the packet 4a acquired from the network 2. For example, the conversion unit 1d converts the destination address of the packet 4a to the address 20.20.20.80 of the apparatus 3a. The conversion unit 1d also converts the source address of the packet 4a to one of the addresses determined by the determination unit 1a, for example, 10.10.20.10. The packet 4b with the converted addresses is transmitted by the transmission unit 1e to the apparatus 3a of the network 3. Specifically, the packet 4b is relayed to the apparatus 3a by the individual relay apparatuses 3b, 3c, 3e, and 3g in the network 3.

Upon reception of the packet 4b, for example, the apparatus 3a executes a process according to the content of the packet 4b, and returns the packet 4c indicating the execution result. The reply packet 4c has a destination address of 10.10.20.10. According to the settings configured by the setting unit 1c, the packet 4c is relayed by the relay apparatuses 3b, 3c, 3e, and 3g to the information processing apparatus 1.

In the information processing apparatus 1, the reception unit 1f receives the packet 4c. Then, based on the packet 4c, the evaluation unit 1g evaluates, for example, whether the apparatus 3a is working properly.

In the above-described manner, route settings are automatically configured for relay apparatuses in a communication route between the apparatus 3a and the information processing apparatus 1 in such a manner that each packet with a destination address corresponding to one of the addresses determined by the determination unit 1a is transferred from the apparatus 3a to the information processing apparatus 1. This reduces the workload involved in the route settings for the relay apparatuses.

In addition, a packet with a source address corresponding to one of the addresses determined by the determination unit 1a is transmitted to the apparatus 3a in order to evaluate the performance of the apparatus 3a, which reduces the route setting work on the relay apparatuses prior to the performance verification of the apparatus 3a. This, in turn, reduces the workload involved in the performance verification of the apparatus 3a.

(b) Second Embodiment

The second embodiment is designed to verify the performance of a verification server installed in a verification-system network by using packets captured from an operating-system network. In the second embodiment, the performance verification of the verification server is achieved by appropriately selecting a suitable address block and transmitting verification data using addresses included in the selected address block. According to the second embodiment, prior to the performance verification, route settings are statically configured for relay apparatuses in a communication route between the verification server and a verification apparatus, to thereby enable packet transfer from the verification server to the verification apparatus.

Figure 2:
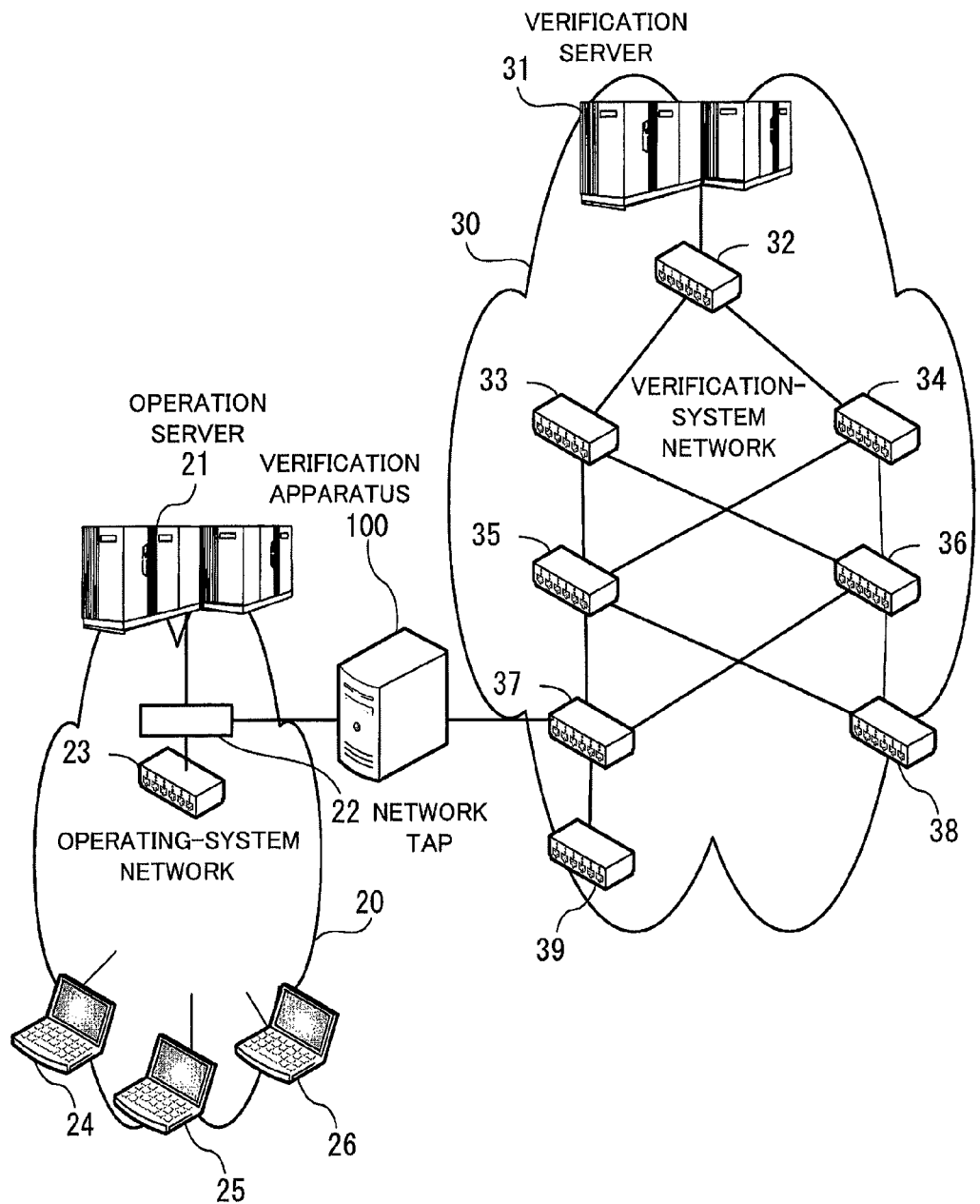
FIG. 2 illustrates an example of a system configuration according to a second embodiment.

FIG. 2 illustrates an example of a system configuration according to the second embodiment. A verification apparatus 100 is provided between an operating-system network 20 and a verification-system network 30, and connected to each of the networks 20 and 30.

The operating-system network 20 includes an operation server 21. The operation server 21 carries out processes in response to requests from terminals 24 to 26 and returns the processing results to the terminals 24 to 26. The operation server 21 is connected to a relay apparatus 23 via a network tap 22. The relay apparatus 23 is a packet relay apparatus for transferring data in the network layer (Layer 3). As the relay apparatus 23, a L3 switch or a router may be used. The network tap 22 is an apparatus for redirecting two-way signals between the relay apparatus 23 and the operation server 21. The network tap 22 transmits the redirected signals to the verification apparatus 100 connected thereto. The verification apparatus 100 acquires packets propagating through the operating-system network 20 based on the signals sent from the network tap 22. Note that acquiring packets based on the signals redirected by the network tap is referred to as 'capturing the packets'. The operating-system network 20 also includes a plurality of terminals 24 to 26. The communication between each of the terminals 24 to 26 and the operation server 21 is relayed by the relay apparatus 23.

The verification-system network 30 includes a verification server 31. The verification server 31 carries out a process in response to each request indicated by verification data sent from the verification apparatus 100 and returns the processing result to the verification apparatus 100. The verification-system network 30 includes a plurality of relay apparatuses 32 to 39, which are packet relay apparatuses for transferring data in the network layer (Layer 3). As the relay apparatuses 32 to 39, L3 switches or routers may be used. Packets transmitted through the verification-system network 30 are relayed by the relay apparatuses 32 to 39. According to the example of FIG. 2, the verification apparatus 100 is connected to the relay apparatus 37, and the verification server 31 is connected to the relay apparatus 32.

Figure 3:
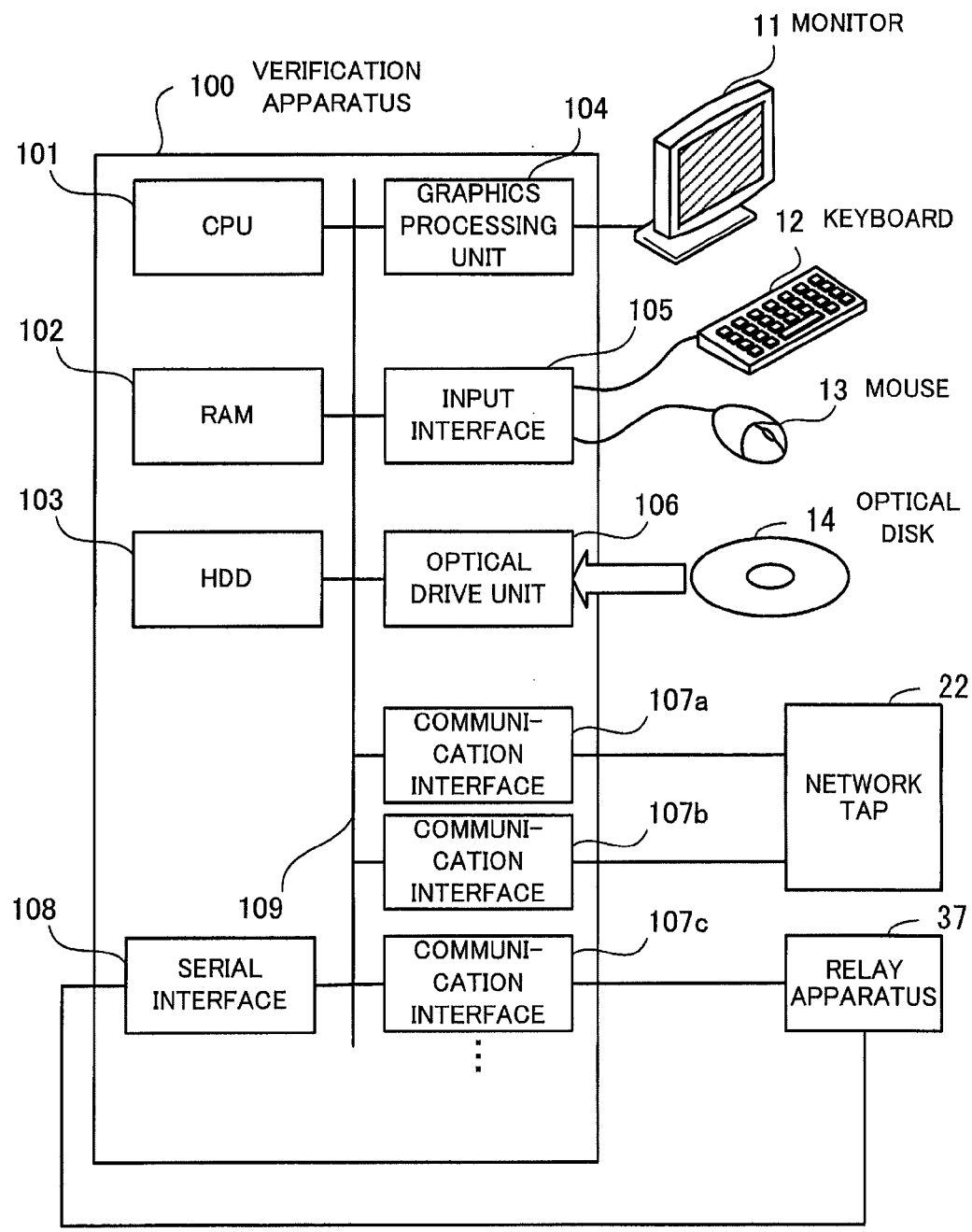
FIG. 3 illustrates an example of a hardware configuration of a verification apparatus according to the second embodiment.

FIG. 3 illustrates an example of a hardware configuration of a verification apparatus according to the second embodiment. Overall control of the verification apparatus 100 is exercised by a CPU 101. To the CPU 101, a random access memory (RAM) 102 and a plurality of peripherals are connected via a bus 109.

The RAM 102 is used as a main storage device of the verification apparatus 100. The RAM 102 temporarily stores at least part of an operating system (OS) program and application programs to be executed by the CPU 101. The RAM 102 also stores therein various types of data to be used by the CPU 101 for its processing.

The peripherals connected to the bus 109 include a hard disk drive (HDD) 103, a graphics processing unit 104, an input interface 105, an optical drive unit 106, a plurality of communication interfaces 107a, 107b, 107c, and so on, and a serial interface 108.

The HDD 103 magnetically writes and reads data to and from a built-in disk, and is used as a secondary storage device of the verification apparatus 100. The HDD 103 stores therein the OS program, application programs, and various types of data. Note that a semiconductor storage device such as a flash memory may be used as a secondary storage device in place of the HDD 103.

To the graphics processing unit 104, a monitor 11 is connected. According to an instruction from the CPU 101, the graphics processing unit 104 displays an image on a screen of the monitor 11. A cathode ray tube (CRT) display or a liquid crystal display, for example, may be used as the monitor 11.

To the input interface 105, a keyboard 12 and a mouse 13 are connected. The input interface 105 transmits signals sent from the keyboard 12 and the mouse 13 to the CPU 101. Note that the mouse 13 is just an example of pointing devices, and a different pointing device such as a touch panel, a tablet, a touch-pad, and a track ball, may be used instead.

The optical drive unit 106 reads data recorded on an optical disk 14 using, for example, laser light. The optical disk 14 is a portable recording medium on which data is recorded in such a manner as to be read by reflection of light. Examples of the optical disk 14 include a digital versatile disc (DVD), a DVD-RAM, a compact disk read only memory (CD-ROM), a CD recordable (CD-R), and a CD-rewritable (CD-RW).

The communication interface 107a is connected to the network tap 22, and acquires, from the network tap 22, packets input to the operation server 21. The communication interface 107b is connected to the network tap 22, and acquires, from the network tap 22, packets output from the operation server 21.

The communication interface 107c is connected to the relay apparatus 37. Packets each including verification data and addressed to the verification server 31 are transmitted from the communication interface 107c to the relay apparatus 37. Packets each indicating the result of a process according to the verification data are transmitted from the relay apparatus 37 to the communication interface 107c.

In the case where there is provided a forth communication interface other than the communication interfaces 107a, 107b, and 107c, the fourth communication interface is connected, for example, to the relay apparatus 37. In this case, the fourth communication interface is used to search for a communication route from the verification apparatus 100 to the verification server 31. A control packet, for example, for route finding is transmitted from the forth communication interface to the relay apparatus 37. Then, the result of the route finding is transmitted from the relay apparatus 37 to the fourth communication interface.

The serial interface 108 is, for example, an RS-2320 interface and implements serial communication. The serial interface 108 is connected, for example, to a console port on the relay apparatus 37. The verification apparatus 100 is able to function as a console terminal of the relay apparatus 37 by inputting and outputting data to and from the console port on the relay apparatus 37 via the serial interface 108.

The hardware configuration described above achieves the processing functions of the second embodiment. Note that the information processing apparatus 1 of the first embodiment may be built with the same hardware configuration as the verification apparatus 100 of FIG. 3. FIG. 3 illustrates the hardware configuration of the verification apparatus 100, however, each of the operation server 21, the terminals 24 to 26, and the verification server 31 may be built with the same hardware configuration as the verification apparatus 100.

According to the second embodiment, verification data is created using a packet acquired from the operating-system network 20, and then used for performance verification of the verification server 31, using the verification-system network 30. In this case, as for the acquired packet addressed to the operation server 21, the verification apparatus 100 changes the source address and destination address of the packet. Specifically, the destination address is changed to an Internet Protocol (IP) address of the verification server 31, and the source address is changed to an address included in a pool address block prepared in advance. The pool address block is an address block prepared in advance for enabling performance verification in the network 30 including the relay apparatus 37 adjacent to the verification apparatus 100.

Figure 4:
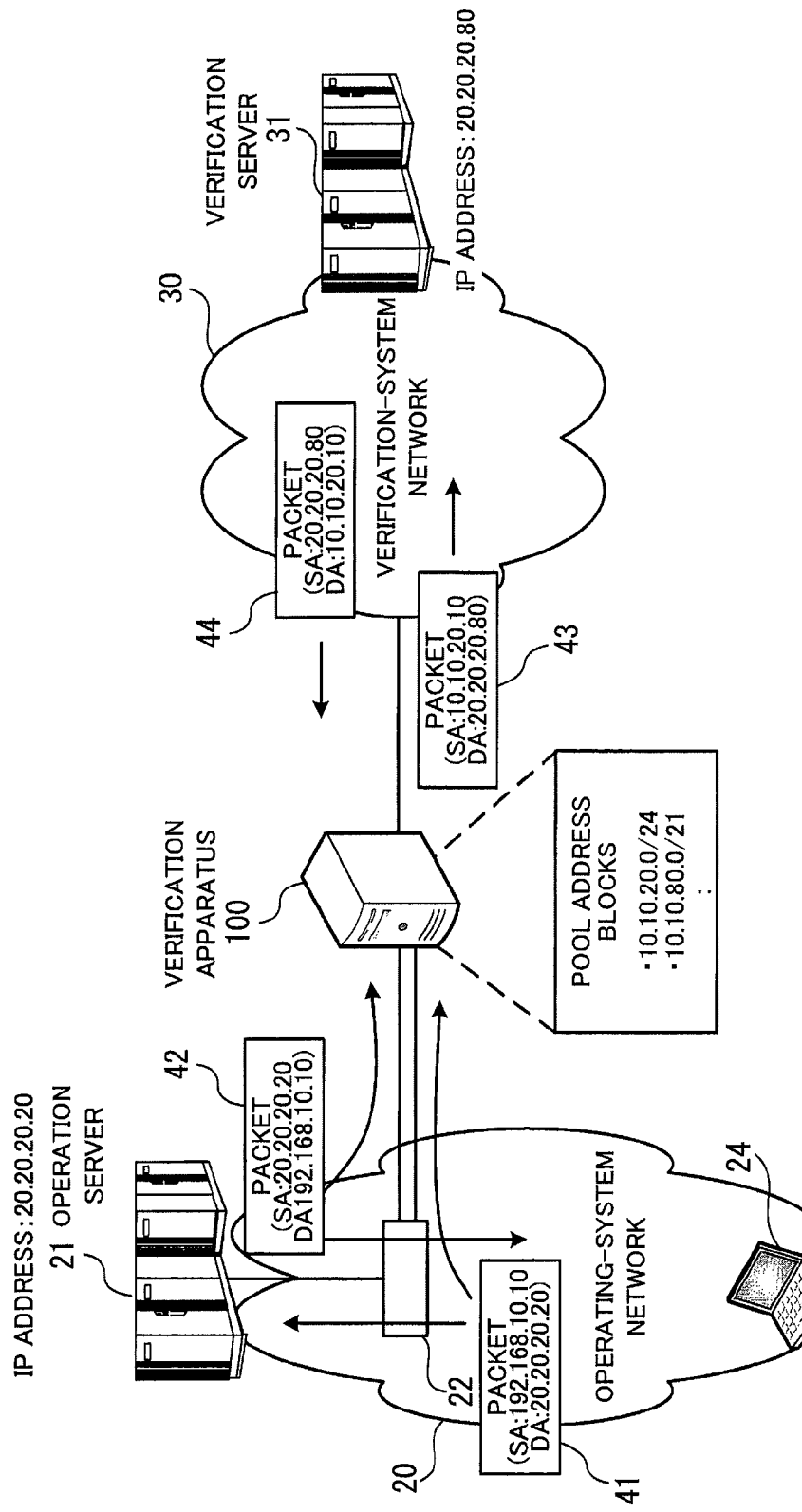
FIG. 4 illustrates an overview of a verification procedure.

FIG. 4 illustrates an overview of a verification procedure. An administrator, for example, inputs information regarding pool address blocks to the verification apparatus 100. Subsequently, the verification apparatus 100 collects packets input and output to and from the operation server 21. For example, a packet 41 transmitted from the terminal 24 to the operation server 21 is redirected by the network tap 22, and then transmitted to both the operation server 21 and the verification apparatus 100. In addition, a packet 42 transmitted from the operation server 21 to the terminal 24 is redirected by the network tap 22, and then transmitted to both the terminal 24 and the verification apparatus 100. The verification apparatus 100 analyzes each of the packets captured via the network tap 22 and then stores information contained in the packet.

Next, based on the packets collected from the operating-system network 20, the verification apparatus 100 selects a suitable address block for the verification from the pool address blocks prepared in advance. For example, based on the collected packets, the verification apparatus 100 counts the number of terminals being used in the operating-system network 20 and selects an address block of an appropriate size according to the number of the terminals. Note that addresses included in the pool address blocks are for testing and are not normally used. Therefore, route settings regarding the pool address blocks have yet to be configured for the individual relay apparatuses in the verification-system network 30 in order not to cause a malfunction. In view of this, the verification apparatus 100 configures route settings for the relay apparatuses in the verification-system network in such a manner that packets with destination addresses each corresponding to one of addresses included in the selected address block are transferred to the verification apparatus 100.

Subsequently, the verification apparatus 100 appropriately rewrites a header and a payload of each of the captured packets. For example, the verification apparatus 100 changes the source address of the packet 41 addressed to the operation server 21 to an address included in the selected address block. Then, the verification apparatus 100 transmits a packet 43 after the change to the verification server 31 of the verification-system network 30. As for the transmission, the verification apparatus 100 is able to adjust the time interval of successive packets transmitted to the verification server 31.

The verification server 31 after receiving the packet 43 carries out a process according to the content of the packet 43, and then outputs a packet 44 for a response. The destination address of the packet 44 is an address set in the packet 43 as the source address by the verification apparatus 100. The packet 44 output from the verification server 31 is relayed by relay apparatuses in the verification-system network 30 and then sent to the verification apparatus 100.

The verification apparatus 100 evaluates the performance of the verification server 31, for example, based on the transmission time of the packet 43 and the reception time of the packet 44. For example, the verification apparatus 100 compares the performance of the verification server 31 with that of the operation server 21 by comparing the time interval for capturing packets transmitted from the operation server 21 and the time interval for acquiring packets transmitted from the verification server 31. In addition, the verification apparatus 100 makes a comparison in terms of the content of the packets and the length of the response time. Then, based on the comparison results, the verification apparatus 100 evaluates the function and performance of the operation server 21 and the verification server 31.

Note that if route settings enabling packets with destination addresses each corresponding to one of the addresses included in the selected address block to reach the verification apparatus 100 are not configured prior to the transmission of packets addressed to the verification server 31, responses from the verification server 31 do not reach the verification apparatus 100 and therefore no verification test is possible. For example, if no such route settings are configured, the packets with destination addresses each corresponding to one of the addresses of the selected address block are relayed from one relay apparatus to another in a predetermined route (default route) and eventually discarded at a relay apparatus which has been configured to discard packets for which no route settings have been made.

If the verification test is conducted using addresses of the terminals in the operating-system network so that route settings regarding pool address blocks need not be considered, responses from the verification server 31 reach the terminals in the operating-system network 20. Clients in the operating-system network 20 do not expect to receive packets transmitted by the verification server 31 in a downlink direction (i.e., the responses from the verification server 31), and such a situation where the clients receive unexpected packets is inappropriate.

As a result, in order to allow the verification apparatus 100 to receive the responses from the verification server 31, route settings regarding a corresponding pool address block need to be configured for relay apparatuses. In general, as the size of a network increases, the number of relay apparatuses in the network also increases, which results in an increase in the workload involved in route settings. Therefore, the workload involved in route settings becomes too much if route information of the selected address block needs to be applied to all relay apparatuses in the network.

In view of the above, the second embodiment is designed to identify relay apparatuses in a communication route between the verification apparatus 100 and the verification server 31, and apply, only to the identified relay apparatuses, route settings regarding an address block used by the verification apparatus 100 for the verification test. This eliminates the need for a manual route setting operation, thus reducing the workload of the administrator. Next described are functions of the verification apparatus 100 capable of reducing the workload involved in route settings.

Figure 5:
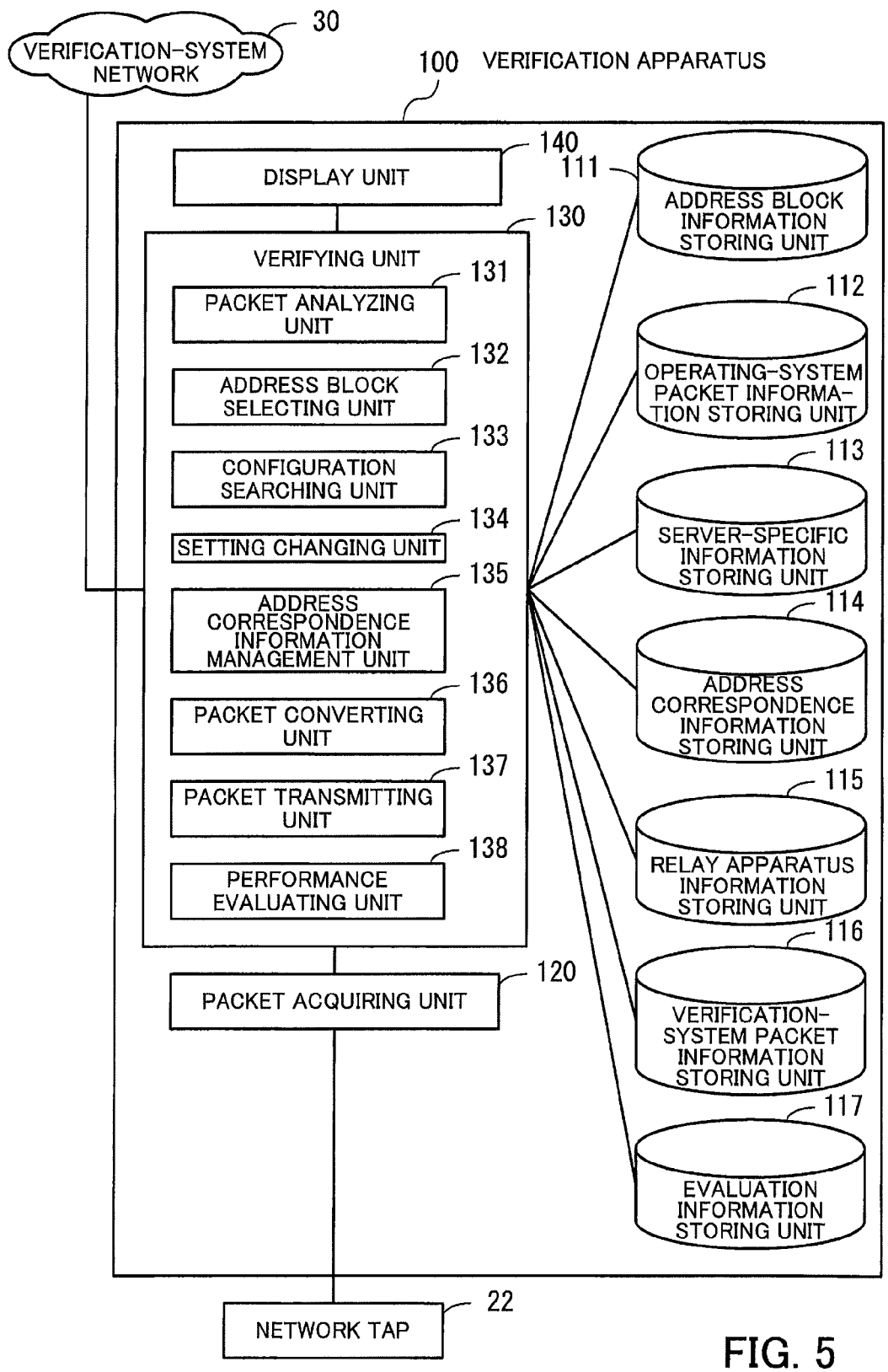
FIG. 5 is a block diagram illustrating functions of the verification apparatus according to the second embodiment.

FIG. 5 is a block diagram illustrating functions of a verification apparatus according to the second embodiment. The verification apparatus 100 includes an address block information storing unit 111, an operating-system packet information storing unit 112, a server-specific information storing unit 113, an address correspondence information storing unit 114, a relay apparatus information storing unit 115, a verification-system packet information storing unit 116, and an evaluation information storing unit 117.

The address block information storing unit 111 stores therein information of prepared address blocks (pool address blocks). For example, the administrator acquires the information of pool address blocks, for example, from an information system section and then registers the information in the address block information storing unit 111.

The operating-system packet information storing unit 112 stores therein information of packets captured from the operating-system network 20.

The server-specific information storing unit 113 stores therein information specific to the operation server 21 and information specific to the verification server 31. For example, information on cookies issued from the operation server 21 is stored in the server-specific information storing unit 113.

The address correspondence information storing unit 114 stores therein correspondence between source addresses of packets captured from the operating-system network 20, which packets have been transmitted to the operation server 21, and source addresses assigned when the packets are transferred to the verification server 31.

The relay apparatus information storing unit 115 stores therein information regarding relay apparatuses in a route between the verification apparatus 100 and the verification server 31.

The verification-system packet information storing unit 116 stores therein information regarding packets having been transmitted from the verification apparatus 100 to the verification server 31 and packets that the verification apparatus 100 has received from the verification server 31.

The evaluation information storing unit 117 stores therein information used to evaluate the performance of the verification server 31. For example, the evaluation information storing unit 117 stores information of a response time until each response message is received after a request message is transmitted to the verification server 31.

Note that a part of the storage area of the RAM 102 or the HDD 103, for example, is used for each of the above-described storage functions.

The verification apparatus 100 includes, as information processing functions, a packet acquiring unit 120, a verifying unit 130, and a display unit 140. The packet acquiring unit 120 captures packets via the network tap 22. The packet acquiring unit 120 transmits the captured packets to the verifying unit 130. The verifying unit 130 performs performance verification of the verification server 31 using the packets received from the packet acquiring unit 120 to thereby evaluate the performance of the verification server 31. The verifying unit 130 transmits the evaluation result to the display unit 140. The display unit 140 displays, on the monitor 11 or the like, the evaluation result of the verification server 31 received from the verification unit 130.

Note that the function of the verifying unit 130 may be subdivided into a plurality of functions. That is, the verifying unit 130 includes a packet analyzing unit 131, an address block selecting unit 132, a configuration searching unit 133, a setting changing unit 134, an address correspondence information managing unit 135, a packet converting unit 136, a packet transmitting unit 137, and a performance evaluating unit 138.

The packet analyzing unit 131 analyzes packets captured from the operating-system network 20. The packet analyzing unit 131 stores information indicated in the analyzed packets in the operating-system packet information storing unit 112.

The address block selecting unit 132 selects, from pool address blocks, an address block to be used for transmission of packets to the verification server 31. For example, the address block selecting unit 132 selects a pool address block of an appropriate size from a plurality of pool address blocks. In this case, the address block selecting unit 132 selects an address block whose size is sufficient enough to make one-to-one correspondence with addresses of all terminals in the operating-system network 20.

The configuration searching unit 133 searches for relay apparatuses in a packet communication route from the verification apparatus 100 to the verification server 31. For example, the configuration searching unit 133 uses a route search algorithm, such as a trace route command, to thereby search for relay apparatuses in the communication route. In the case of using a trace route command, for example, the configuration searching unit 133 instructs the OS of the verification apparatus 100 to execute a trace route command with the address of the verification server 31 designated. In response, the OS transmits predetermined control packets in the communication route extending to the verification server 31 to thereby acquire addresses of relay apparatuses and the hop count to each of the relay apparatuses. The hop count is the number of relay apparatuses present in the route from the verification apparatus 100 to the detected relay apparatus. The hop count to a relay apparatus adjacent to the verification apparatus 100 is 1. The configuration searching unit 133 receives, from the OS, the execution result of the trace route command. Alternatively, in order to check relay apparatuses in the route to the verification server 31, the configuration searching unit 133 may refer to information of a network configuration diagram. As yet another way to check relay apparatuses in the route to the verification server 31, the configuration searching unit 133 may acquire apparatus management information, such as Management Information Base (MIB) information, from relay apparatuses. The MIB information is information held by relay apparatuses managed under the Simple Network Management Protocol (SNMP). The configuration searching unit 133 stores, in the relay apparatus information storing unit 115, information of the relay apparatuses detected in the searching.

The setting changing unit 134 configures settings for the relay apparatuses detected by the configuration searching unit 133 in such a manner that packets with destination addresses corresponding to addresses included in the address block selected by the address block selecting unit 132 are transferred to the verification apparatus 100.

The address correspondence information managing unit 135 determines, from addresses included in the address block selected by the address block selecting unit 132, an address used as a source address of each packet to be transmitted to the verification server 31. Then, the address correspondence information managing unit 135 stores, in the address correspondence information storing unit 114, the correspondence between a source address of each packet transmitted to the operation server 21 and an address assigned as a source address when the packet is transmitted to the verification server 31.

The packet converting unit 136 changes the destination and the source of each packet captured from the operating-system network 20 and then outputs the packet to the verification-system network 30. For example, the packet converting unit 136 sets, in the source address field of the captured packet, an address associated by the address correspondence information managing unit 135. In addition, the packet converting unit 136 sets the address of the verification server 31 in the destination address field of the captured packet. As for the captured packet, the packet converting unit 136 is able to convert the content of the payload or parts of the header other than the address part. For example, in the case where the payload of the captured packet includes information specific to application software of the operation server 21, the packet converting unit 136 converts the information to information specific to application software of the verification server 31.

The packet transmitting unit 137 transmits, to the verification server 31, each packet whose destination, source, and the like have been converted by the packet converting unit 136.

The performance evaluating unit 138 verifies the performance of the verification server 31 based on each packet transmitted to the verification server 31 by the packet transmitting unit 137 and a packet returned from the verification server 31 in response to the transmitted packet.

Note that, in FIG. 5, each line connecting the individual components represents a part of the communication paths, and communication paths other than the one illustrated in FIG. 5 are also configurable. Each of the following functions of FIG. 5 is an example of a corresponding unit of the first embodiment of FIG. 1: the address block selecting unit 132 is an example of the determination unit 1a; the configuration searching unit 133 is an example of the identification unit 1b; the setting changing unit 134 is an example of the setting unit 1c; the packet converting unit 136 is an example of the conversion unit 1d; the packet transmitting unit 137 is an example of the transmission unit 1e; and the performance evaluating unit 138 is an example of an integrated assembly of the reception unit 1f and the evaluation unit 1g.

Next described are structures of data stored in the individual storing units of the verification apparatus 100 with reference to FIGS. 6 to 12.

Figure 6:
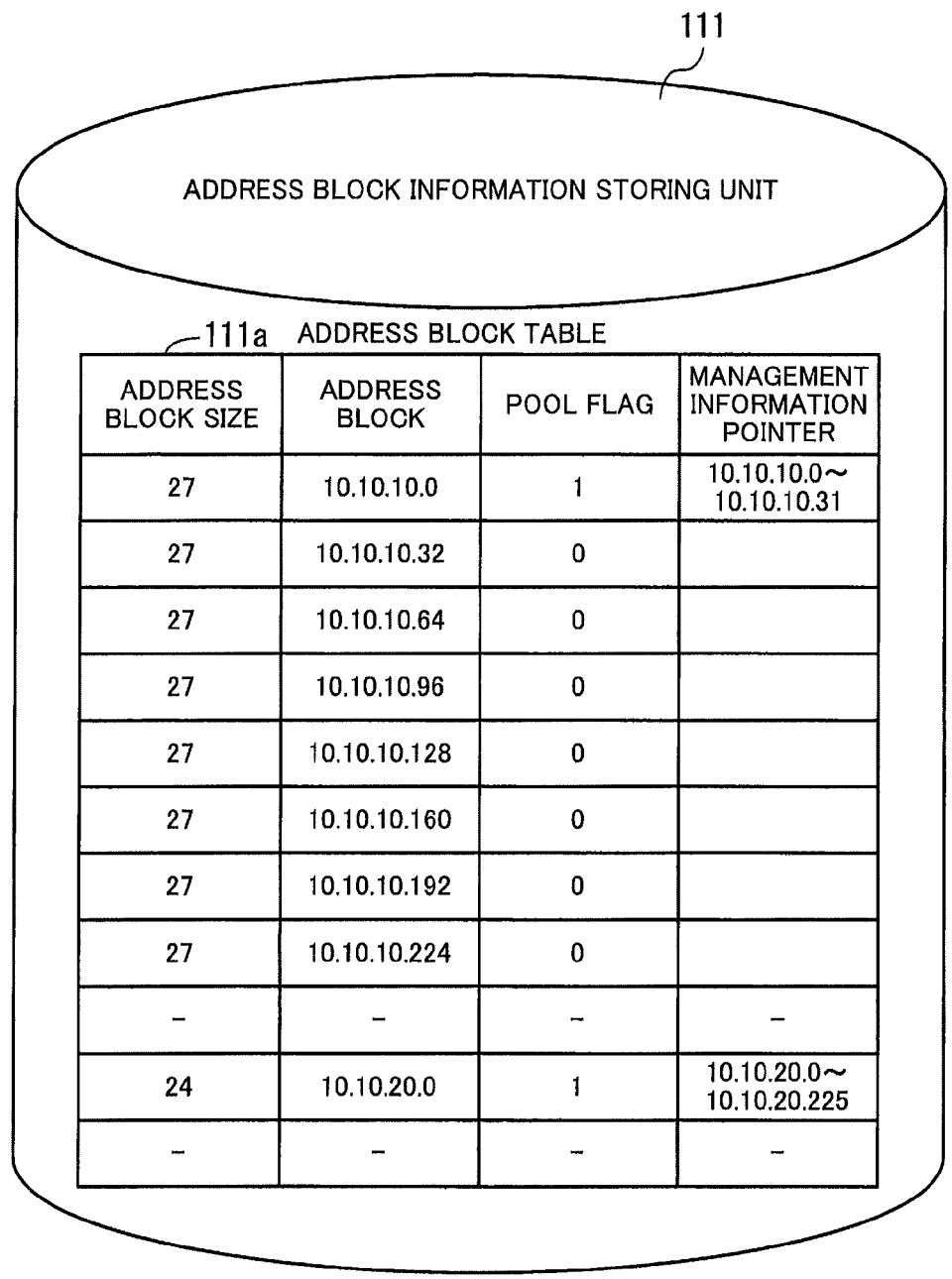
FIG. 6 illustrates an example of a data structure of an address block information storing unit.

FIG. 6 illustrates an example of a data structure of an address block information storing unit. The address block information storing unit 111 stores therein an address block table 111a, which is a data table carrying information on individual address blocks. The address block table 111a includes columns for address block size, address block, pool flag, and management information pointer.

In the address block size column, each entry contains the numerical value representing the size of a corresponding address block. The address block size indicates the number of addresses included in the address block. In the example of FIG. 6, the size of each address block is represented by the number of bits of the net mask. The net mask is information indicating the network portion of an IP address. In the case of representing the length of the net mask in bits, a first designated number of bits of the IP address indicates the network portion. As the number of bits used for the network portion of the IP address is smaller, the number of bits for the host portion becomes larger, which therefore increases the number of addresses included in the corresponding address block. Note that an IP address with the host portion set to all zeros is a network address identifying a network itself, and is therefore not available to be used as a source address of a packet for the verification. In addition, an IP address with the host portion set to all ones is a broadcast address, and is therefore not available to be used as a source address of a packet for the verification. For example, an address block with an address block size of 24 contains 254 individual addresses. An address block with an address block size of 27 contains 30 individual addresses.

In the address block column, each entry contains the network address of an address block. In the pool flag column, each entry contains the flag (pool flag) indicating whether a corresponding address block has been pooled. In the example of FIG. 6, a pooled address block has a pool flag of 1 and an address block yet to be pooled has a pool flag of 0. In the management information pointer column, each entry contains the information indicating, within the address correspondence information storing unit 114, locations at which management information of individual addresses included in a corresponding address block is stored. In the example of FIG. 6, the locations of management information within the address correspondence information storing unit 114 are indicated by a corresponding range of IP addresses.

FIG. 7 illustrates an example of a data structure of an operating-system packet information storing unit. The operating-system packet information storing unit 112 includes an operating-system packet management table 112a, which is a data table where information carried in each packet captured from the operating-system network 20 is registered. The operating-system packet management table 112a includes columns for session ID, time, SA, DA, SP, DP, sequence number, ACK number, SYN, ACK, PSH, FIN, RST, header, and message body.

In the session ID column, each entry contains identification data of a session (session ID) used for message communication. In the time column, each entry contains the capture time of a corresponding packet. In the SA column, each entry contains the IP address of a source of a corresponding packet. In the DA column, each entry contains the IP address of a destination of a corresponding packet. In the SP column, each entry contains the IP port number of a source of a corresponding packet. In the DP column, each entry contains the IP port number of a destination of a corresponding packet. In the sequence number column, each entry contains the sequence number of a corresponding packet. In the ACK number column, each entry contains the acknowledgement number of a corresponding packet. In the SYN column, the Sync (SYN) flag is set if a corresponding packet is an initial packet for requesting establishment of a Transmission Control Protocol (TCP) connection. In the ACK column, the Acknowledge (ACK) flag is set to indicate an acknowledgement. In the PSH column, the Push (PSH) flag is set to request immediate delivery of received data to an application without buffering. In the FIN column, the Finish (FIN) flag is set to request termination of a connection. In the RST column, the Reset flag is set to indicate that the connection has been terminated abruptly. In the header column, each entry contains a method to send a request message or a status code of a response message. The method indicates the type of a process according to a request, and GET method and POST method are examples of such a method. The status code is a number indicating the status of a process according to a request message. For example, the status code in the case where a process has been successful is '200'. Note that an additional message, such as 'OK', added to the status code, is also set in entries of the header column. In the message body column, each entry contains the content of a message included in a corresponding packet.

Note that the operating-system packet information storing unit 112 may store items of information other than those illustrated in FIG. 7. For example, in the case where a request transmission time or a response reception time is acquired from each captured packet, such information may also be stored in the operating-system packet information storing unit 112.

Figure 8:
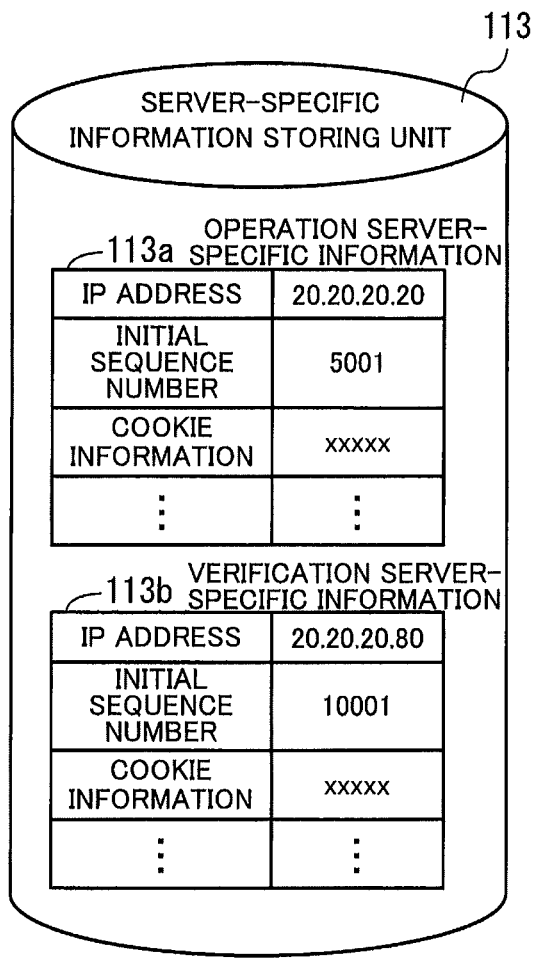
FIG. 8 illustrates an example of a data structure of a server-specific information storing unit.

FIG. 8 illustrates an example of a data structure of a server-specific information storing unit. The server-specific information storing unit 113 includes operation server-specific information 113a and verification server-specific information 113b.

The operation server-specific information 113a carries information specific to the operation server 21. For example, the operation server-specific information 113a includes, as the information specific to the operation server 21, an IP address, an initial sequence number sent to the operation server 21 in a three-way handshake, and cookie information set in the HyperText Transfer Protocol (HTTP) header.

The verification server-specific information 113b carries information specific to the verification server 31. For example, the verification server-specific information 113b includes, as the information specific to the verification server 31, an IP address, an initial sequence number sent to the verification server 31 in a three-way handshake, and cookie information set in the HTTP header. Note that the IP address of the verification server 31 has been registered in advance by the administrator. On the other hand, the cookie information and the initial sequence number are randomly assigned by an application or an operating system (OS).

Figure 9:
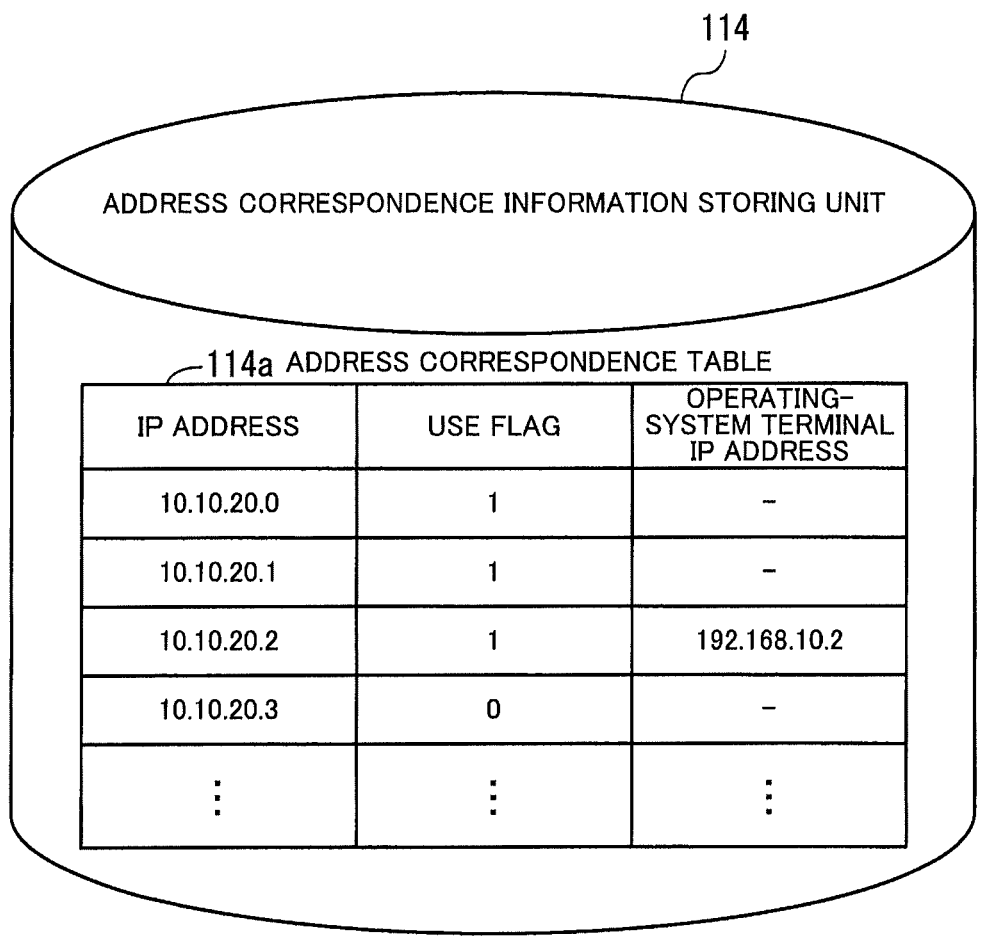
FIG. 9 is an example of a data structure of an address correspondence information storing unit.

FIG. 9 is an example of a data structure of an address correspondence information storing unit. The address correspondence information storing unit 114 stores therein an address correspondence table 114a, which includes columns for IP address, use flag, and operating-system terminal IP address. In the IP address column, each entry contains an IP address included in a pool address block. In the use flag column, each entry contains a flag indicating whether a corresponding IP address is in use (use flag). For example, the use flag is set to 1 when the corresponding IP address is in use. On the other hand, the use flag is set to 0 when the corresponding IP address is not in use. Note that as for a network address with the host portion set to all zeros, the use flag is set to 1 in advance. For an address used by each relay apparatus in the verification-system network 30, the use flag is set to 1 in advance. In the operating-system terminal IP address column, each entry contains the IP address of a terminal in the operating-system network 20, which IP address is set as a source address in a captured packet.

Figure 10:
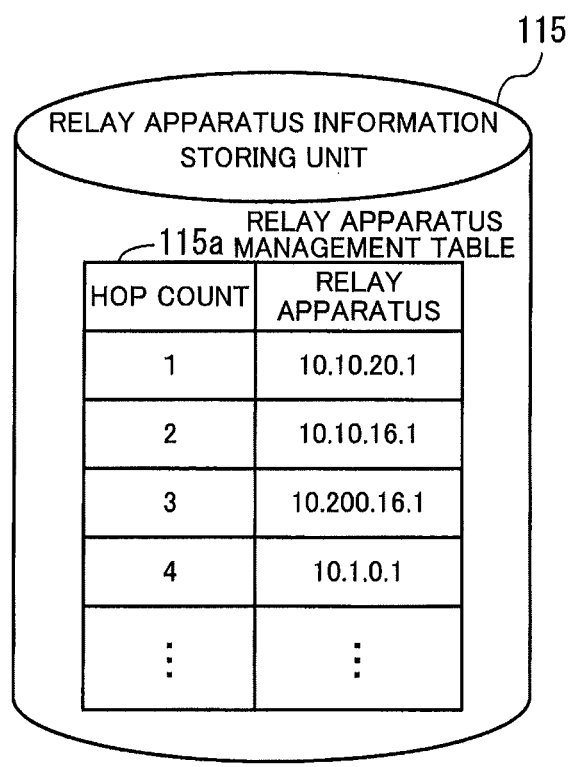
FIG. 10 illustrates an example of a data structure of a relay apparatus information storing unit.

FIG. 10 illustrates an example of a data structure of a relay apparatus information storing unit. The relay apparatus information storing unit 115 includes a relay apparatus management table 115a, which includes columns for hop count and relay apparatus. In the hop count column, each entry contains the number of hops to a relay apparatus indicated by a corresponding IP address. In the relay apparatus column, each entry contains an IP address of a relay apparatus on the route between the verification apparatus 100 and the verification server 31.

FIG. 11 illustrates an example of a data structure of a verification-system packet information storing unit. The verification-system packet information storing unit 116 includes a verification-system packet management table 116a, which is a data table where information carried in each packet exchanged through the verification-system network 30 is registered. The verification-system packet management table 116a includes columns for session ID, time, SA, DA, SP, DP, sequence number, ACK number, SYN, ACK, PSH, FIN, RST, header, and message body. The type of information set in each of the columns of the verification-system packet management table 116a is the same as that set in the column of the same name in the operating-system packet management table 112a of FIG. 7.

Figure 12:
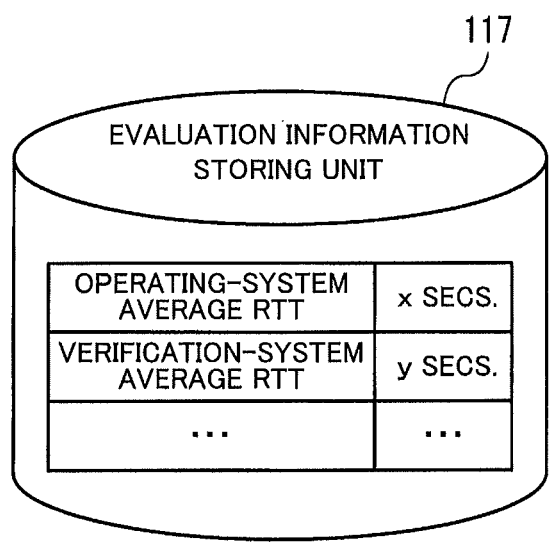
FIG. 12 illustrates an example of a data structure of an evaluation information storing unit.

FIG. 12 illustrates an example of a data structure of an evaluation information storing unit. The evaluation information storing unit 117 stores therein information used for evaluation of the verification server 31. For example, the average application delay (also referred to as the response time) of the operation server 21 and the average application delay of the verification server 31 are stored. The application delay is the elapsed time from the transmission of a request message to the reception of a response message.

Using the above-described data, the performance verification of the verification server 31 of the verification-system network 30 is carried out. Next, the performance verification process is described in detail.

Figure 13:
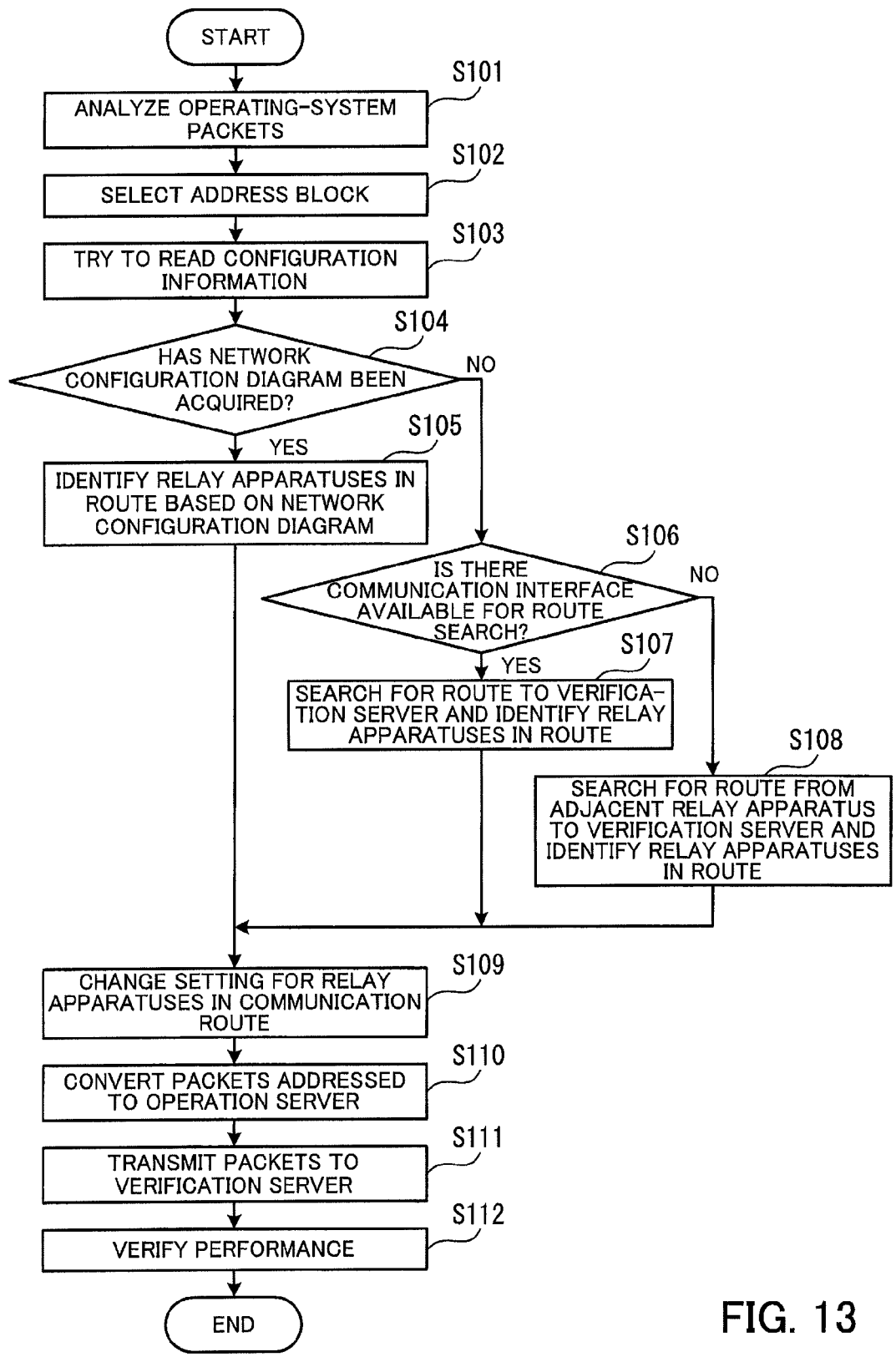
FIG. 13 is a flowchart illustrating an example of a performance verification procedure.

FIG. 13 is a flowchart illustrating an example of a performance verification procedure. The performance verification procedure of FIG. 13 is described next according to the step numbers in the flowchart.

[Step S101] The packet analyzing unit 131 receives each packet captured from the operating-system network 20 via the packet acquiring unit 120, and then analyzes the packet. Subsequently, the packet analyzing unit 131 stores, in the operating-system packet information storing unit 112, information contained in the captured packet. For example, the packet analyzing unit 131 stores the capture time, the header information, the payload information and the like of the captured packet in the operating-system packet information storing unit 112. In addition, the packet analyzing unit 131 stores, in the server-specific information storing unit 113, information acquired by analyzing the captured packet, such as an initial sequence number sent to the operation server 21 in a three-way handshake and cookie information.

[Step S102] The address block selecting unit 132 selects, from pool address blocks, an address block to be used. For example, with reference to the address block table 111*a* of the address block information storing unit 111, the address block selecting unit 132 selects an address block from address blocks with the pool flag set to 1. For example, based on packet information stored in the operating-system packet information storing unit 112, the address block selecting unit 132 counts the number of the terminals 24 to 26 connected to the operating-system network 20. Subsequently, the address block selecting unit 132 selects, from among address blocks each having addresses equal to or more than the number of the terminals 24 to 26, an address block with the smallest size possible. This selection allows efficient use of address blocks.

Once selecting an address block, the address block selecting unit 132 associates the IP address of each of the terminals 24 to 26 of the operating-system network with an IP address in the selected address block. Subsequently, the address block selecting unit 132 registers the IP address correspondence in the address correspondence table 114*a* of the address correspondence information storing unit 114.

[Step S103] The configuration searching unit 133 tries to read configuration information of the verification-system network 30. For example, an internal network configuration diagram (also referred to as the network topology information) may be acquired from an information system division when testing is implemented. Such a network configuration diagram indicates the connections among the verification apparatus 100, and the verification server 31 and the relay apparatuses 32 to 39 of the verification-system network 30 illustrated in FIG. 2, for example. In view of this, the configuration searching unit 133 sets in advance a location for storing a network configuration diagram of the verification-system network 30. The configuration searching unit 133 tries to read a network configuration diagram from the storage location. If a network configuration diagram has been stored, the configuration searching unit 133 is able to read the network configuration diagram. When no network configuration diagram is stored, the process of reading a network configuration diagram by the configuration searching unit 133 is terminated with an error.

[Step S104] The configuration searching unit 133 determines whether the network configuration diagram has been acquired. If having acquired the network configuration diagram, the configuration searching unit 133 moves the procedure to step S105. If not, the configuration searching unit 133 moves the procedure to step S106.

[Step S105] When having acquired the network configuration diagram, the configuration searching unit 133 identifies, on the network configuration diagram, relay apparatuses disposed between the verification apparatus 100 and the verification server 31. For example, based on the network configuration diagram, the configuration searching unit 133 detects the shortest communication route between the verification apparatus 100 and the verification server 31. The shortest communication route here means, for example, a communication route with the least number of relay apparatuses for packet relaying. Then, the configuration searching unit 133 identifies relay apparatuses in the detected communication route. In the case of the verification-system network 30 of FIG. 2, the communication route through the relay apparatuses 32, 33, 35, and 37 is the shortest communication route between the verification server 31 and the verification apparatus 100. Therefore, the relay apparatuses 32, 33, 35, and 37 are identified. Subsequently, the configuration searching unit 133 moves the procedure to step S109.

[Step S106] When the network configuration diagram is not acquired, the configuration searching unit 133 determines whether there is a communication interface available for route search. For example, the communication interface for communicating with the verification server 31 may be used only for communication of packets whose source addresses are IP addresses included in pool address blocks, and thus may not be used for route search. In such a case, if the verification apparatus 100 is provided with a plurality of communication interfaces connected to the adjacent relay apparatus 37, one communication interface is used for communication with the verification server 31 while a different one of the communication interfaces is available for route search. The communication interface used for route search is assigned an IP address different from one assigned to the communication interface used for communication with the verification server 31. If there is a communication interface available for route search, the configuration searching unit 133 moves the procedure to step S107. If not, the configuration searching unit 133 moves the procedure to step S108.

[Step S107] When the verification apparatus 100 is connected to the adjacent relay apparatus 37 through a communication interface available for route search, the configuration searching unit 133 searches a communication route between the verification server 31 and the verification apparatus 100 via the communication interface. Then, the configuration searching unit 133 identifies relay apparatuses in the detected communication route. For example, the configuration searching unit 133 transmits a traceroute (or tracert) command with the IP address of the verification server 31 designated. In response, each of the relay apparatuses 32, 33, 35, and 37 in the communication route between the verification server 31 and the verification apparatus 100 returns an response with its IP address. Note that a ping command may be used instead for the route search. A ping command with the -r option enables acquisition of information on relay apparatuses in a communication route to a communication partner corresponding to a designated IP address. Subsequently, the configuration searching unit 133 moves the procedure to step S109.

[Step S108] When the verification apparatus 100 is not connected to the adjacent relay apparatus 37 through a communication interface available for route search, the configuration searching unit 133 searches for a route from the adjacent relay apparatus 37 to the verification server 31, and then identifies relay apparatuses in the route. For example, the configuration searching unit 133 makes access to the relay apparatus 37 as a console terminal via the serial interface 108 connected to the relay apparatus 37. Then, the configuration searching unit 133 logs in to the relay apparatus 37 to thereby search for a route from the relay apparatus 37 to the verification server 31.

Alternatively, the configuration searching unit 133 may remotely log in to the relay apparatus 37 to thereby search for a communication route from the relay apparatus 37 to the verification server 31. For example, the verification apparatus 100 and the relay apparatuses 32 to 39 may be connected through a management network, separately from the verification-system network 30 of FIG. 2. In the management network, the verification apparatus 100 and the relay apparatus 37 may not be adjacent to each other. In such a case, by remotely logging in to the relay apparatus 37 to thereby search for a communication route from the relay apparatus 37 to the verification server 31, the configuration searching unit 133 is able to comprehend a communication route from the verification apparatus 100 to the verification server 31 in the verification-system network 30.

[Step S109] The setting changing unit 134 executes a process of changing a setting ('setting changing process') for each of the relay apparatuses in the communication route between the verification server 31 and the verification apparatus 100. The setting changing process is implemented in such a manner that, as for packets whose destination addresses individually correspond to one of IP addresses included in the address block selected in step S102, the packets are transferred toward the verification apparatus 100 through the communication route between the verification server 31 and the verification apparatus 100. For example, the setting changing unit 134 remotely logs in to each of the relay apparatuses in the communication route, and then configures a route setting regarding the selected address block for the relay apparatus. Subsequently, the setting changing unit 134 instructs the relay apparatus to save the setting change before logging out of the relay apparatus. If such a series of processing for setting change is described in advance in a program, such as a script, it is possible to automate the setting changing process simply by executing the program.

Information set for each of the relay apparatuses by the setting changing unit 134 includes an IP address of the selected address block (i.e., network address); the size of the selected address block (subnet mask); and the IP address of the next hop or interface. For example, the following is how to configure a static route setting for each relay apparatus: # ip route <IP address of address block> <subnet mask> <next hop OR interface>, where # is a command prompt, and the character string following # is an instruction to the relay apparatus.

[Step S110] As for packets addressed to the operation server 21, captured from the operating-system network 20, the packet converting unit 136 converts the packets so as to be addressed to the verification server 31. For example, the packet converting unit 136 extracts the packets addressed to the operation server 21 from the operating-system packet information storing unit 112 in order of capture time. The packet converting unit 136 changes the destination address of each of the extracted packets to the IP address of the verification server 31. Note that the IP address of the verification server 31 is acquired from the verification server-specific information 113b of the server-specific information storing unit 113.

In addition, the packet converting unit 136 makes an inquiry to the address correspondence information managing unit 135 about an address included in the selected address block, based on the source address (address of a terminal) of each of the extracted packets. In response, the address correspondence information managing unit 135 refers to the address correspondence table 114a of the address correspondence information storing unit 114 to thereby determine whether there is an IP address included in the selected address block, corresponding to the IP address of the indicated terminal. If such a corresponding IP address is already present, the address correspondence information managing unit 135 notifies the packet converting unit 136 of the IP address. If such a corresponding IP address is absent, the address correspondence information managing unit 135 selects, from the selected address block, an IP address with the use flag set to 0, and then notifies the packet converting unit 136 of the selected IP address. At this point, the address correspondence information managing unit 135 changes, in the address correspondence table 114a, the use flag of the selected IP address to 1. The packet converting unit 136 converts the source address of the extracted packet to the IP address notified by the address correspondence information managing unit 135.

In addition, the packet converting unit 136 may make predetermined changes to the session ID, sequence number, and cookie information of the packet by referring to information stored in the server-specific information storing unit 113.

[Step S111] The packet transmitting unit 137 sequentially transmits the packets converted by the packet converting unit 136 to the verification server 31. At this point, the packet transmitting unit 137 is able to adjust the time interval of the packets to be transmitted. For example, the packet transmitting unit 137 transmits the packets at the same time interval as the acquisition cycle of successively captured packets. This enables the implementation of the performance verification test at the same load level. In addition, the packet transmitting unit 137 is also able to transmit packets converted from the successively captured packets at a shorter time interval than the acquisition cycle of the captured packets. This enables the implementation of the performance verification test at an accelerated level (i.e., a test with an increased load).

Note that the packet transmitting unit 137 registers information of the transmitted packets in the verification-system packet management table 116a of the verification-system packet information storing unit 116.

[Step S112] The performance evaluating unit 138 compares the performance of the verification server 31 with that of the operation server 21. For example, the performance evaluating unit 138 acquires packets returned from the verification server 31, and registers information of the acquired packets in the verification-system packet management table 116a of the verification-system packet information storing unit 116. Then, the performance evaluating unit 138 calculates the performance of the operation server 21 based on the information registered in the operating-system packet information storing unit 112. In addition, the performance evaluating unit 138 calculates the performance of the verification server 31 based on the information registered in the verification-system packet information storing unit 116. For example, the performance evaluating unit 138 calculates the average application delay for each of the operation server 21 and the verification server 31. The performance evaluating unit 138 stores information about the calculated performance in the evaluation information storing unit 117.

Subsequently, the performance evaluating unit 138 compares the information about the performance of the verification server 31 with that of the operation server 21, to thereby evaluate the performance of the verification server 31. If the verification server 31 delivers higher performance, the performance evaluating unit 138 outputs an evaluation result recommending an operational transition to the verification server 31. If the verification server 31 and the operation server 21 are equivalent for the performance, the performance evaluating unit 138 outputs an evaluation result suggesting the possibility of an operational transition to the verification server 31. If the operation server 21 excels in the performance, the performance evaluating unit 138 outputs an evaluation result recommending a review of an operational transition to the verification server 31. The evaluation result output from the performance evaluating unit 138 is, for example, displayed on the monitor 11 by the display unit 140.

Figure 14:
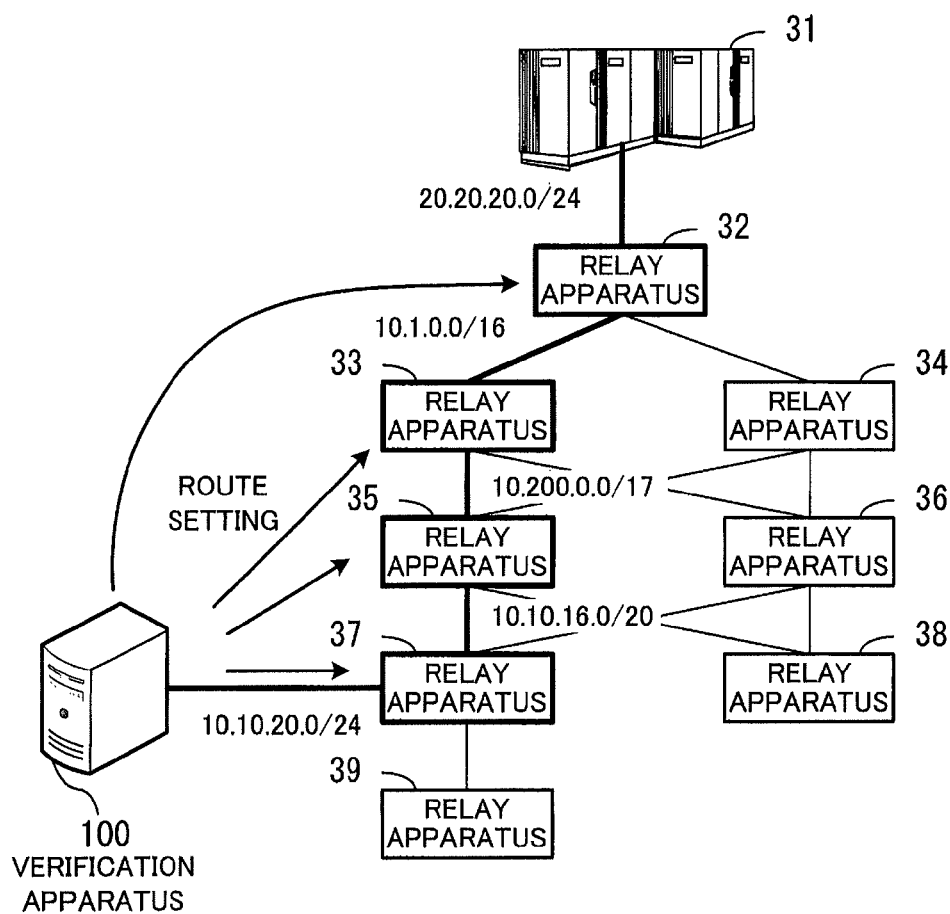
FIG. 14 illustrates an example of route settings according to the second embodiment.

FIG. 14 illustrates an example of route settings according to the second embodiment. In the second embodiment, the individual relay apparatuses 32 to 39 statically manage route information. Therefore, for each of the relay apparatuses 32, 33, 35, and 37 in the communication route to the verification server 31, the verification apparatus 100 configures a route setting regarding the address block selected from the pool address blocks.

In the example of FIG. 14, the verification server 31 has an address of 20.20.20.80. The address of the subnetwork between the verification server 31 and the relay apparatus 32 is 20.20.20.0/24. The address of the subnetwork between the relay apparatuses 32 and 33 is 10.1.0.0/16. The address of the subnetwork between the relay apparatuses 33 and 35 is 10.200.0.0/17. The address of the subnetwork between the relay apparatuses 35 and 37 is 10.10.16.0/20.

Assume in this situation that the address block '10.10.20.0/24' is selected from the pool address blocks. In this case, a route setting is configured for the relay apparatus 32 in such a manner that packets with destination addresses each corresponding to one of addresses included in the address block '10.10.20.0/24' are transferred to the relay apparatus 33 via a communication interface connected to the subnetwork with the address 10.1.0.0/16. Similarly, for the relay apparatus 33, a route setting is configured in such a manner that packets with destination addresses each corresponding to one of addresses included in the address block '10.10.20.0/24' are transferred to the relay apparatus 35 via a communication interface connected to the subnetwork with the address 10.200.0.0/17. For the relay apparatus 35, a route setting is configured in such a manner that packets with destination addresses each corresponding to one of addresses included in the address block '10.10.20.0/24' are transferred to the relay apparatus 37 via a communication interface connected to the subnetwork with the address 10.10.16.0/20. For the relay apparatus 37, a route setting is configured in such a manner that packets with destination addresses each corresponding to one of addresses included in the address block '10.10.20.0/24' are transferred to the verification apparatus 100 via a communication interface connected to the verification apparatus 100. That is, the route setting for the relay apparatus 37 is configured so that the subnetwork between the relay apparatus 37 and the verification apparatus 100 has the address '10.10.20.0/24'.

Note that in the route setting for each relay apparatus, either one of the following information items is set in association with the subnetwork address 10.10.20.0/24: identification information of a communication interface for outputting the packets with destination addresses each corresponding to one of addresses included in the address block '10.10.20.0/24'; and the IP address of an adjacent relay apparatus in the communication route.

Then, from this point onward, packets whose destination addresses are individually one of IP addresses included in the selected address block, transmitted from the verification server 31, are transferred to the verification apparatus 100.

Thus, according to the second embodiment, route settings regarding an address block to be used in the performance verification process are configured only for relay apparatuses in the communication route between the verification apparatus 100 and the verification server 31, which simplifies the route setting process. This achieves efficient performance verification of the verification server 31.

In addition, according to the second embodiment, the route settings are achieved by registering, in the relay apparatuses present in the communication route, only the address of the address block selected from the pool address blocks. Therefore, a substantial reduction in the workload involved in the test implementation may be achieved. That is, the address of each terminal in the operating-system network 20 is associated one-to-one with an address included in the selected address block. If route settings regarding the individual associated addresses of the selected address block are configured for each of the relay apparatuses, the route setting process needs to be performed for each of the relay apparatuses as many times as the number of terminals. On the other hand, according to the second embodiment, route settings are configured using the address of the selected address block (network address), and thereby the route setting process needs to be performed only once for each of the relay apparatuses. Thus, the second embodiment offers improved efficiency in the route setting process.

As described above, according to the second embodiment, it is possible to significantly reduce the workload involved in configuring network route settings regarding a verification-test pool address block for relay apparatuses. This results in quick, accurate, reliable and simple implementation of a performance evaluation test for the verification server 31 distant from the operating-system network 20.

(c) Third Embodiment

A third embodiment is described next. The third embodiment is directed to the case where relay apparatuses are capable of dynamically managing route information. The dynamic management of route information refers to the function of each relay apparatus for exchanging route information indicating transfer destinations of packets and updating its own route information.

Note that the system configuration and internal configuration of each apparatus according to the third embodiment are the same as those of the second embodiment illustrated in FIGS. 2 to 5. In view of this, the third embodiment is described next using the reference numerals of the individual components in FIGS. 2 to 5. Note however that the relay apparatus information storing unit 115 of the third embodiment has a different data structure from that of the second embodiment.

Figure 15:
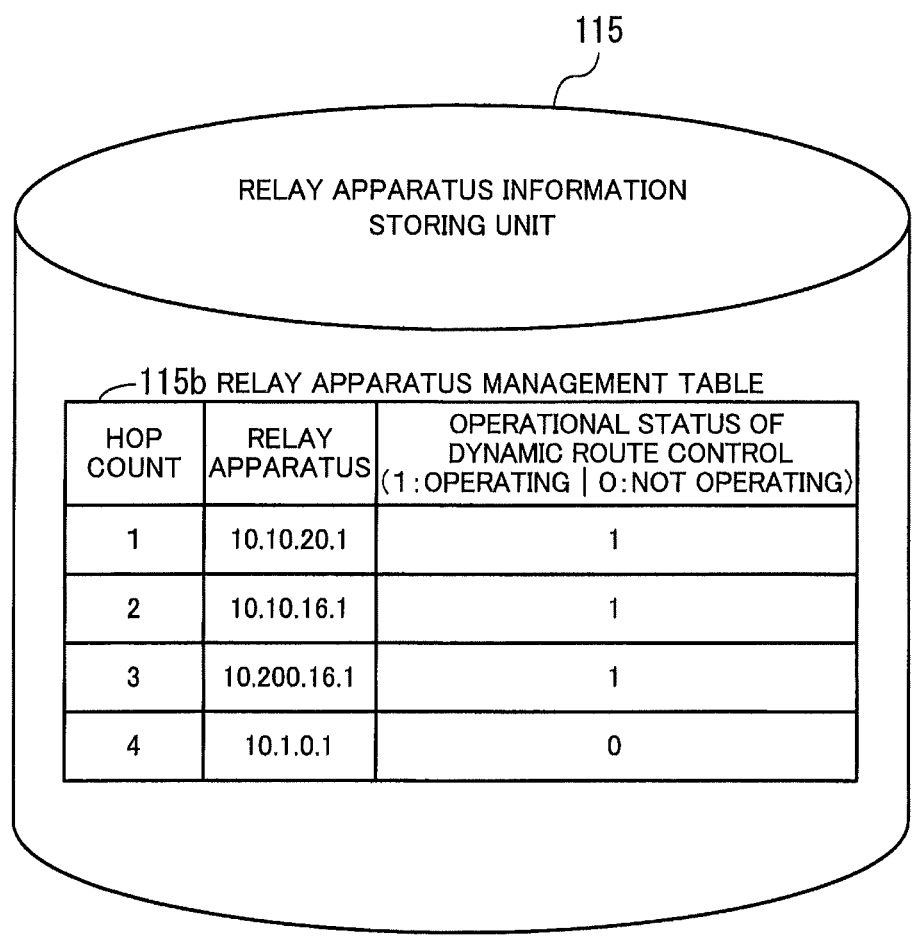
FIG. 15 illustrates an example of a data structure of a relay apparatus information storing unit according to a third embodiment.

FIG. 15 illustrates an example of a data structure of a relay apparatus information storing unit according to the third embodiment. A relay apparatus management table 115*b* of the third embodiment includes columns for hop count, relay apparatus, and operational status of dynamic route control. The type of information set in each of the hop count and relay apparatus columns is the same as that set in the column of the same name in the relay apparatus management table 115a of the second embodiment illustrated in FIG. 10.

In the operational status of dynamic route control column, each entry contains the flag indicating whether dynamic route control is in operation in a corresponding relay apparatus. For example, when the dynamic route control is in operation, 1 is set in the entry of the operational status of dynamic route control column. On the other hand, when the dynamic route control is not in operation, 0 is set therein.

Thus, management of the operational status of dynamic route control allows the relay apparatuses in the communication route between the verification apparatus 100 and the verification server 31 to be classified into ones in which dynamic route control is in operation and ones in which dynamic route control is not in operation. In general, not many networks are configured in such a manner that a relay apparatus with dynamic route control being not in operation is disposed between relay apparatuses with dynamic route control being in operation. In the case where a relay apparatus with dynamic route control being not in operation is included in a network, such a relay apparatus is often found close to either end of the communication route. Therefore, for relay apparatuses with dynamic route control being in operation, the route settings are achieved by applying a route setting only to one relay apparatus selected from the relay apparatuses. On the other hand, if there is more than one relay apparatus with dynamic route control being not in operation, a route setting is applied to each of the relay apparatuses.

Figure 16:
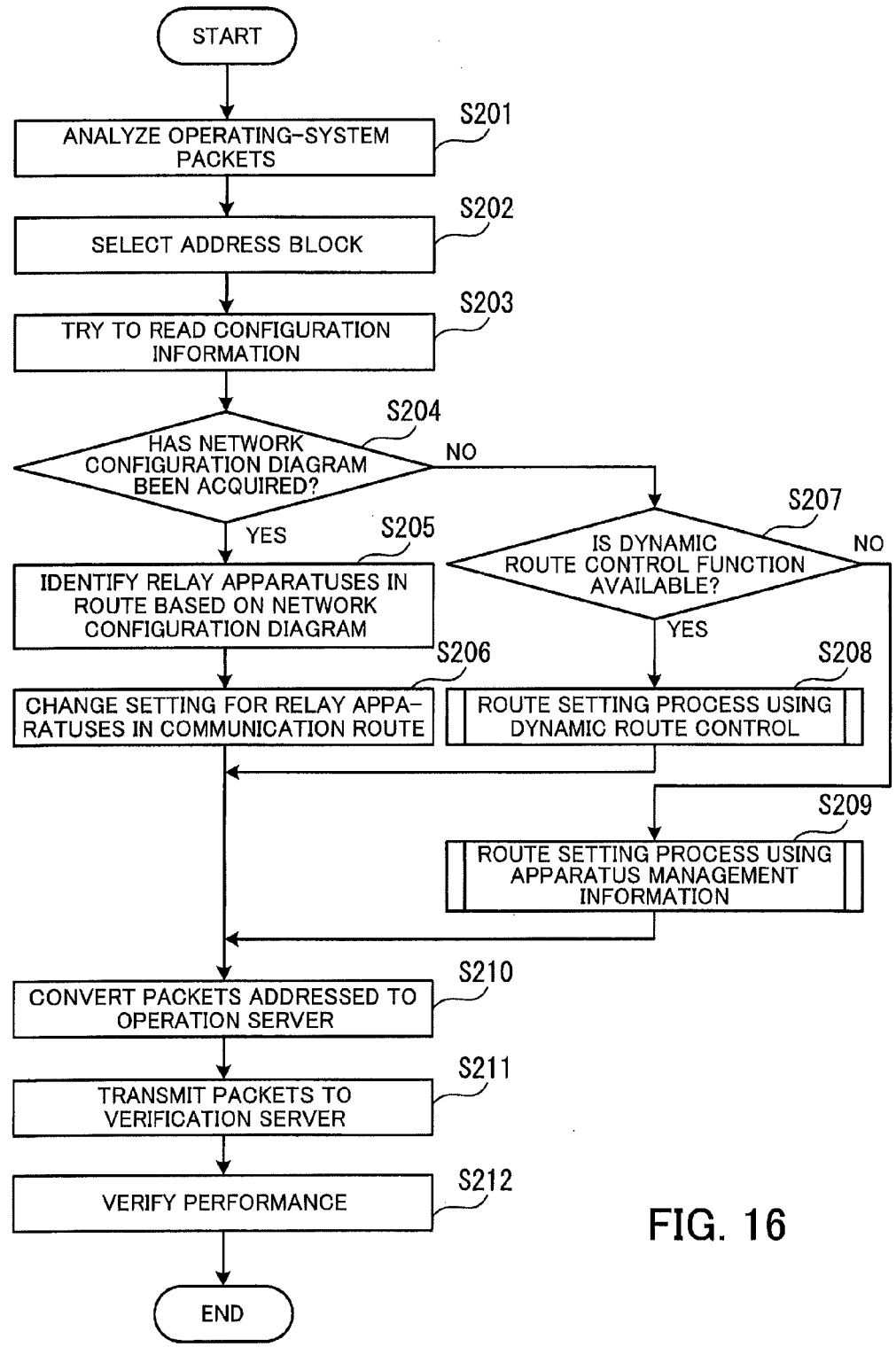
FIG. 16 is a flowchart illustrating an example of a performance verification procedure according to the third embodiment.

FIG. 16 is a flowchart illustrating an example of a performance verification procedure according to the third embodiment. Note that operations of steps S201 to S206 of FIG. 16 are the same as those of steps S101 to S105 and S109, respectively, of FIG. 13. In addition, operations of steps S210 to S212 are the same as those of steps S110 to S112, respectively, of FIG. 13. Therefore, among operations of FIG. 16, ones different from the operations of the second embodiment illustrated in FIG. 13 are described according to the step numbers in the flowchart.

[Step S207] When the network configuration diagram is determined not to be acquired in step S204, the configuration searching unit 133 determines whether the dynamic route control function is available to propagate a statically configured route setting. For example, the administrator presets, in a predetermined storage area in the verification apparatus 100, a flag indicating whether the dynamic route control function is available. By referring to the preset flag, the configuration searching unit 133 determines whether dynamic route control is available. If dynamic route control is available, the configuration searching unit 133 moves the procedure to step S208. If not, the configuration searching unit 133 moves the procedure to step S209.

[Step S208] The configuration searching unit 133 executes a route setting process using dynamic route control. The details of the process are described later (see FIG. 17). Subsequently, the configuration searching unit 133 moves the procedure to step S210.

[Step S209] The configuration searching unit 133 executes a route setting process using apparatus management information. The details of the process are described later (see FIG. 18). Subsequently, the configuration searching unit 133 moves the procedure to step S210.

Figure 17:
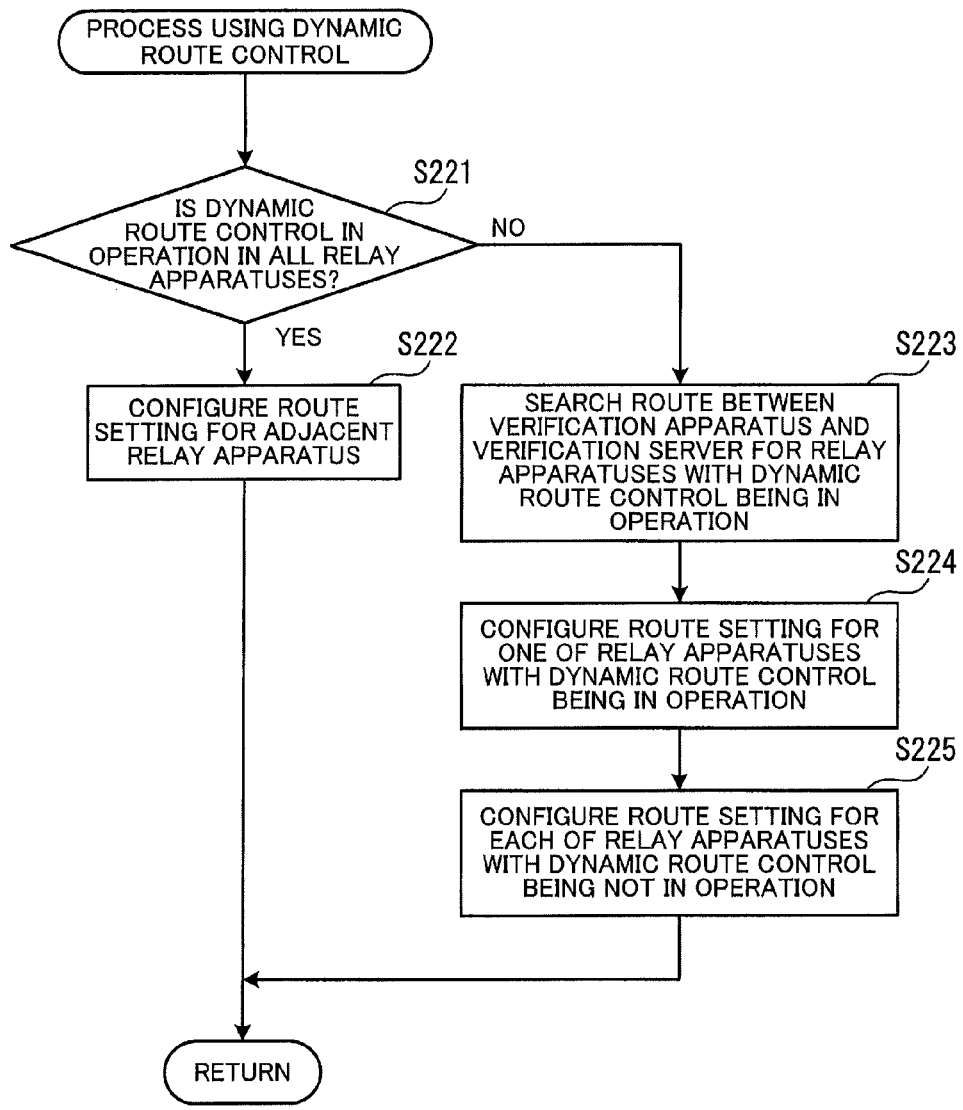
FIG. 17 is a flowchart illustrating an example of a route setting procedure using dynamic route control.

Next described is the route setting process using dynamic route control. FIG. 17 is a flowchart illustrating an example of a route setting procedure using dynamic route control. The route setting procedure of FIG. 17 is described next according to the step numbers in the flowchart.

[Step S221] The configuration searching unit 133 determines whether dynamic route control is in operation in all the relay apparatuses. For example, the administrator presets, in a predetermined storage area of the verification apparatus 100, a flag indicating whether dynamic route control is in operation in all the relay apparatuses. By referring to the preset flag, the configuration searching unit 133 determines whether dynamic route control is in operation in all the relay apparatuses. If dynamic route control is in operation in all the relay apparatuses, the configuration searching unit 133 moves the procedure to step S222. If dynamic route control is not in operation in at least one of the relay apparatuses, the configuration searching unit 133 moves the procedure to step S223.

[Step S222] The setting changing unit 134 configures a route setting regarding the address block selected from the pool address blocks for the relay apparatus 37 adjacent to the verification apparatus 100. The content of the route setting is transmitted from the rely apparatus 37 to the remaining relay apparatuses 32 to 36, 38, ad 39. Subsequently, the route setting process using dynamic rout control ends, and then the performance verification process advances to step S210 of FIG. 16.

[Step S223] The configuration searching unit 133 searches the communication route between the verification apparatus 100 and the verification server 31 for relay apparatuses with dynamic route control being in operation. For example, the configuration searching unit logs in to the relay apparatus 37 via the serial interface 108, and makes an inquiry into the setting content of each relay apparatus via the relay apparatus 37 to thereby determine whether dynamic route control is in operation in the relay apparatus.

[Step S224] The setting changing unit 134 configures a route setting regarding the selected address block for one of the relay apparatuses (for example, the adjacent relay apparatus 37) with dynamic route control being in operation. For example, the setting changing unit 134 logs in to the relay apparatus 37 via the serial interface 108 to execute the route setting process. With this, the configured route information is propagated through the remaining relay apparatuses with dynamic route control being in operation, and the route setting regarding the selected address block is automatically applied to each of the relay apparatuses.

[Step S225] The setting changing unit 134 configures a route setting regarding the selected address block for each of relay apparatuses with dynamic route control being not in operation, disposed between the verification apparatus 100 and the verification server 31. For example, the setting changing unit 134 logs in to the relay apparatus 37 via the serial interface 108 and accesses each relay apparatus with dynamic route control being not in operation via the relay apparatus 37 to thereby execute the route setting process. Subsequently, the route setting process using dynamic route control ends, and then the performance verification process advances to step S210 of FIG. 16.

Figure 18:
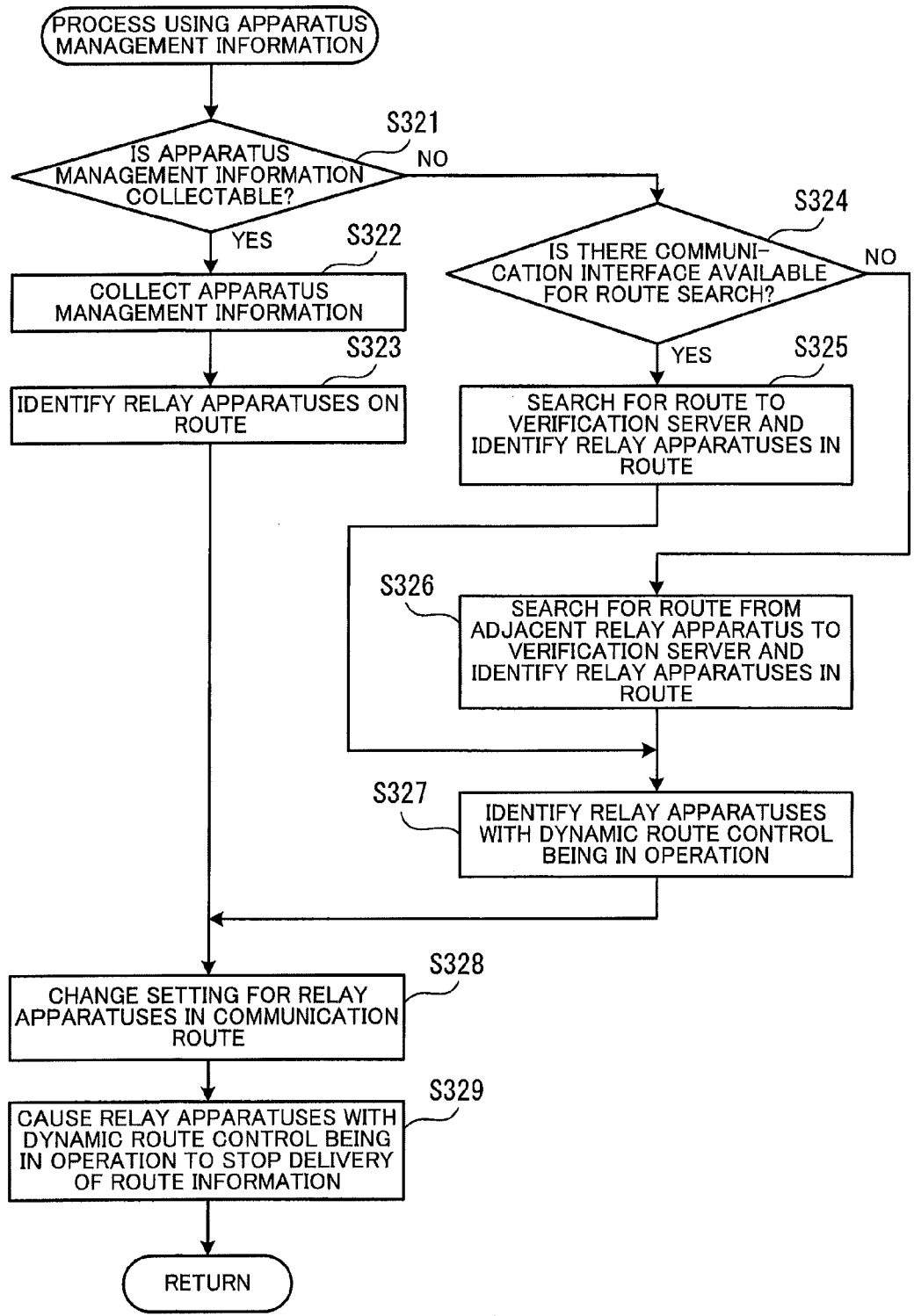
FIG. 18 is a flowchart illustrating an example of a route setting procedure using apparatus management information.

Next described is the route setting process using apparatus management information. FIG. 18 is a flowchart illustrating an example of a route setting procedure using apparatus management information. Note that operations of steps S324 to S326, and S328 of FIG. 18 are the same as those of steps S106 to S109, respectively, of FIG. 13. Therefore, among operations of FIG. 18, ones different from the operations of the second embodiment illustrated in FIG. 13 are described according to the step numbers in the flowchart.

[Step S321] The configuration searching unit 133 determines whether apparatus management information is collectable. For example, the administrator presents, in a predetermined storage area of the verification apparatus 100, a flag indicating whether the apparatus management information is collectable. By referring to the preset flag, the configuration searching unit 133 determines whether the apparatus management information is collectable. If the apparatus management information is collectable, the configuration searching unit 133 moves the procedure to step S322. If not, the configuration searching unit 133 moves the procedure to step S324.

[Step S322] The configuration searching unit 133 collects the apparatus management information from each of the relay apparatuses 32 to 39. For example, the configuration searching unit 133 logs in to the relay apparatus 37 via the serial interface 108 to thereby collect the apparatus management information using an SNMP command.

The following is an example of acquiring MIB information as the apparatus management information of the relay apparatus 37 connected to the verification apparatus 100 by using an SNMP command.

snmpwalk -c public (IP address of relay apparatus) -v2c ipCidrRouteIfIndex
IP-FORWARD-MIB::ipCidrRouteIfIndex.10.10.16.0.255.255.0.0.0.0.0.0=INTEGER:1
IP-FORWARD-MIB::ipCidrRouteIfIndex.10.10.20.0.255.255.255.0.0.0.0.0=INTEGER:2
IP-FORWARD-MIB::ipCidrRouteIfIndex.10.10.21.0.255.255.255.0.0.0.0.0=INTEGER:3

The letter string following '#' above is an SNMP command, and the following three line segments represent the execution result of the SNMP command. According to the execution result, packets whose destination IP address is 10.10.16.0 are transmitted from an interface with an index of 1. In addition, packets whose destination IP address is 10.10.20.0 are transmitted from an interface with an index of 2. Further, packets whose destination IP address is 10.10.21.0 are transmitted from an interface with an index of 3.

For example, it is prescribed that, among addresses included in address blocks, addresses with only the last bit of the host portion being 1 and all the remaining bits being 0 are used as addresses of relay apparatuses. In this case, as for address blocks indicated by the addresses acquired from the adjacent relay apparatus 37 using the SNMP command, the configuration searching unit 133 transmits SNMP commands similar to the SNMP command sent to the relay apparatus 37 to, among addresses included in the address blocks, IP addresses with only the last bit of the host portion being 1. With this, the configuration searching unit 133 is able to acquire the apparatus management information from all the relay apparatuses 32 to 39. The acquisition of the apparatus management information from all the relay apparatuses 32 to 39 allows an understanding of the configuration of the verification-system network 30.

[Step S323] With the configuration of the verification-system network 30 understood based on the apparatus management information, the configuration searching unit 133 identifies a communication route between the verification apparatus 100 and the verification server 31 and relay apparatuses on the communication route. Subsequently, the configuration searching unit 133 moves the procedure to step S328.

[Step S327] When the apparatus management information is not collectable, the configuration searching unit 133 carries out steps S324 to S326, and then identifies, among relay apparatuses on the communication route between the verification apparatus 100 and the verification server 31, relay apparatuses with dynamic route control being in operation. For example, the configuration searching unit 133 captures a packet propagating through the verification-system network 30 and detects route information communicated by dynamic route control. Then, the configuration searching unit 133 identifies relay apparatuses having transmitted the route information as relay apparatuses with dynamic route control being in operation. Subsequently, the configuration searching unit 133 moves the procedure to step S328.

In step S328, a static route setting is configured for each relay apparatus on the communication route, as in step S109 of FIG. 13, and then the route setting procedure moves to step S329.

[Step S329] The setting changing unit 134 applies, to the relay apparatuses with dynamic route control being in operation, a setting to stop the delivery of the route information under dynamic route control. For example, when the apparatus management information is collectable, the setting changing unit 134 determines, based on the apparatus management information, whether dynamic route control is in operation with respect to each relay apparatus. When the apparatus management information is not collectable, the setting changing unit 134 recognizes the relay apparatuses identified in step S327 as relay apparatuses with dynamic route control being in operation. Then, the setting changing unit 134 applies, to the relay apparatuses with dynamic route control being in operation, a setting to stop the delivery of the route information (flooding stop setting). Subsequently, the route setting process using the apparatus management information ends, and then the performance verification process advances to step S210 of FIG. 16.

Note that when relay apparatuses with dynamic route control being in operation are unable to be identified, the setting to stop the delivery of route information may be applied to all relay apparatuses.

In the above-described manner, when the verification-system network 30 includes relay apparatuses having the dynamic route control function, the route settings are achieved efficiently.

Figure 19:
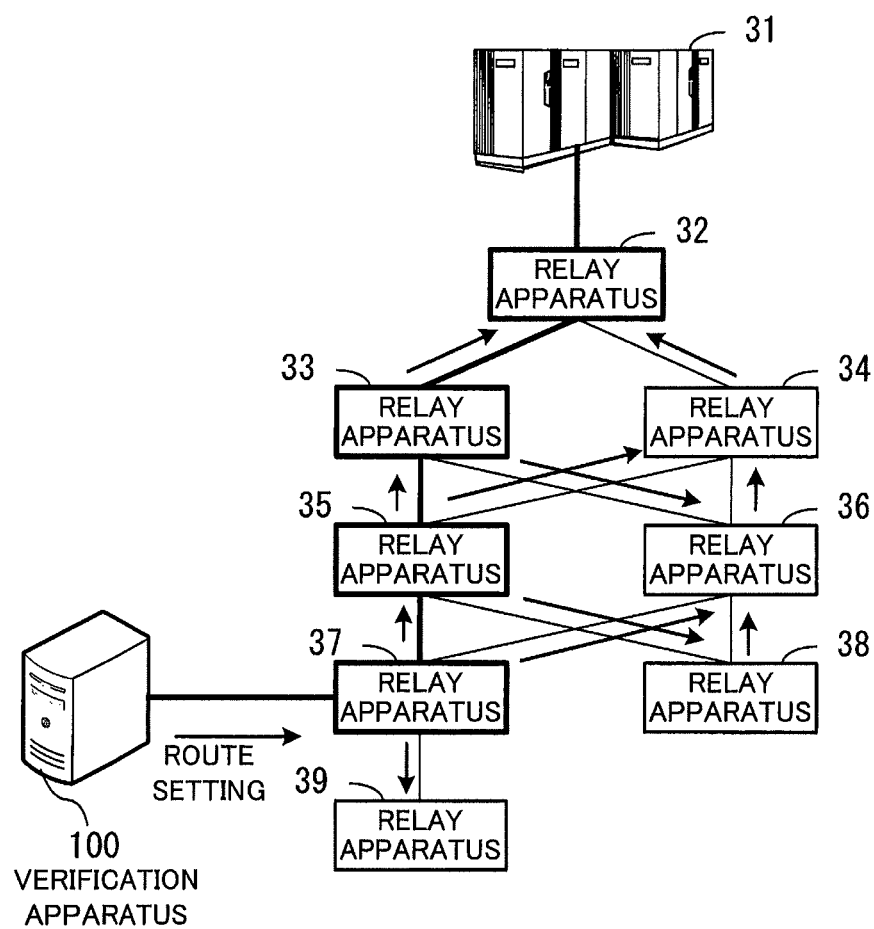
FIG. 19 illustrates an example of route settings by the dynamic route control.

FIG. 19 illustrates an example of route settings by dynamic route control. The example of FIG. 19 depicts the case in which dynamic route control is in operation in all the relay apparatuses 32 to 39. In such a case, for example, the verification apparatus 100 logs in to the relay apparatus 37 via the serial interface 108 and configures, for the relay apparatus 37, a route setting regarding the address block selected from the pool address blocks. The route setting applied to the relay apparatus 37 is passed on to the remaining relay apparatuses 32 to 36, 38, and 39 as dynamic route information. Then, the route setting regarding the selected address block is also configured for each of the relay apparatuses 32 to 36, 38, and 39.

Note that the verification apparatus 100 may create route information including a route for the address block selected from the pool address block, which route information is to be exchange among relay apparatuses by dynamic route control, and then transmit the created route information to the relay apparatus 37. In this case, the relay apparatus 37 updates its own route information based on the received route information, and passes on the updated content to the remaining relay apparatuses 32 to 36, 38, and 39. In response, the route setting regarding the selected address block is also applied to the relay apparatuses 32 to 36, 38, and 39.

Thus, in the case where route information statically set for a relay apparatus is allowed to be passed on through the verification-system network 30 by a dynamic route control algorithm, the route setting process is achieved simply by applying a static route setting to some relay apparatuses (only one relay apparatus in the example of FIG. 19) in the communication route between the verification apparatus 100 and the verification server 31.

In summary, if dynamic route control is in operation in all the relay apparatuses of the verification-system network 30, route information regarding the address of the address block selected from the pool address blocks is applied to the relay apparatus 37 by static route setting. Then, the route information applied to the relay apparatus 37 is passed on to all the remaining relay apparatuses in the verification-system network 30 by the dynamic route control algorithm.

On the other hand, if dynamic route control is in operation in not all the relay apparatuses of the verification-system network 30, first, relay apparatuses on the communication route between the verification apparatus 100 and the verification server 31 are identified. Next, the identified relay apparatuses are classified into relay apparatuses with dynamic route control being in operation and those with dynamic route control being not in operation. Then, the route information regarding the address of the address block selected from the pool address blocks is applied, by static route setting, to all the relay apparatuses with dynamic route control being not in operation as well as one of the relay apparatuses with dynamic route control being in operation. This contributes to a reduction in the processing load involved in configuring route settings for the relay apparatuses on the communication route.

Note that when dynamic route control is in operation, an alternative route is calculated if a network failure occurs during the performance verification test, and thus communication is carried out using the alternative route bypassing the failed part. Therefore, it is possible to continue the performance verification test.

Figure 20:
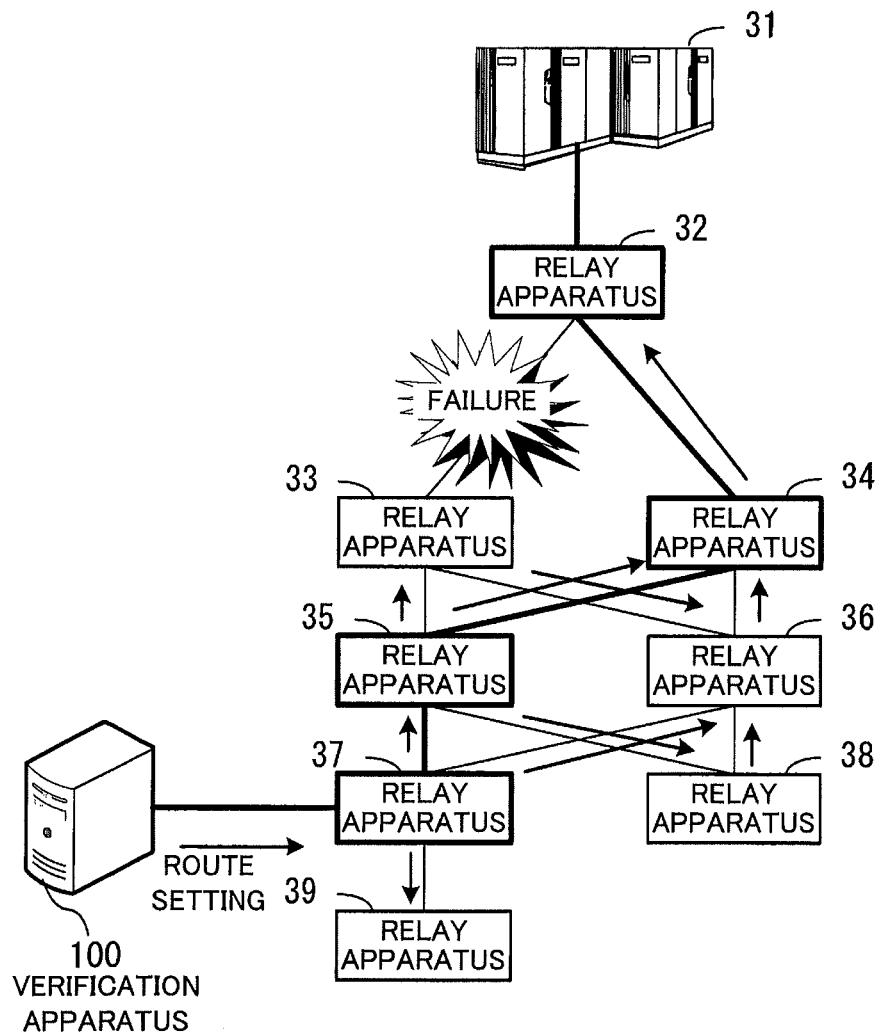
FIG. 20 illustrates an example of a communication situation at the occurrence of a failure.

FIG. 20 illustrates an example of communication situation at the occurrence of a failure. In the example of FIG. 20, a failure has occurred in a route between the relay apparatuses 32 and 33. When route settings by dynamic route control are allowed, information about the breaking of the route due to the failure is dynamically passed on, for example, from the relay apparatus 33 to all the remaining relay apparatuses. As a result, the communication route between the verification server 31 and the verification apparatus 100 is changed, for example, to a route through the relay apparatuses 32, 34, 35, and 37.

Note that if restarting of the operation verification test is desired after the route modification, the operation verification test may be restarted after the route before the failure occurrence is stored, then the current operation verification test is disrupted, and the causes of the network failure are investigated and the network is restored.

In addition, according to the third embodiment, when it is not allowed to pass on statically set route information by dynamic route control, the route information delivery stop process (flooding stop process) is carried out so that the statically set route information does not propagate.

Figure 21:
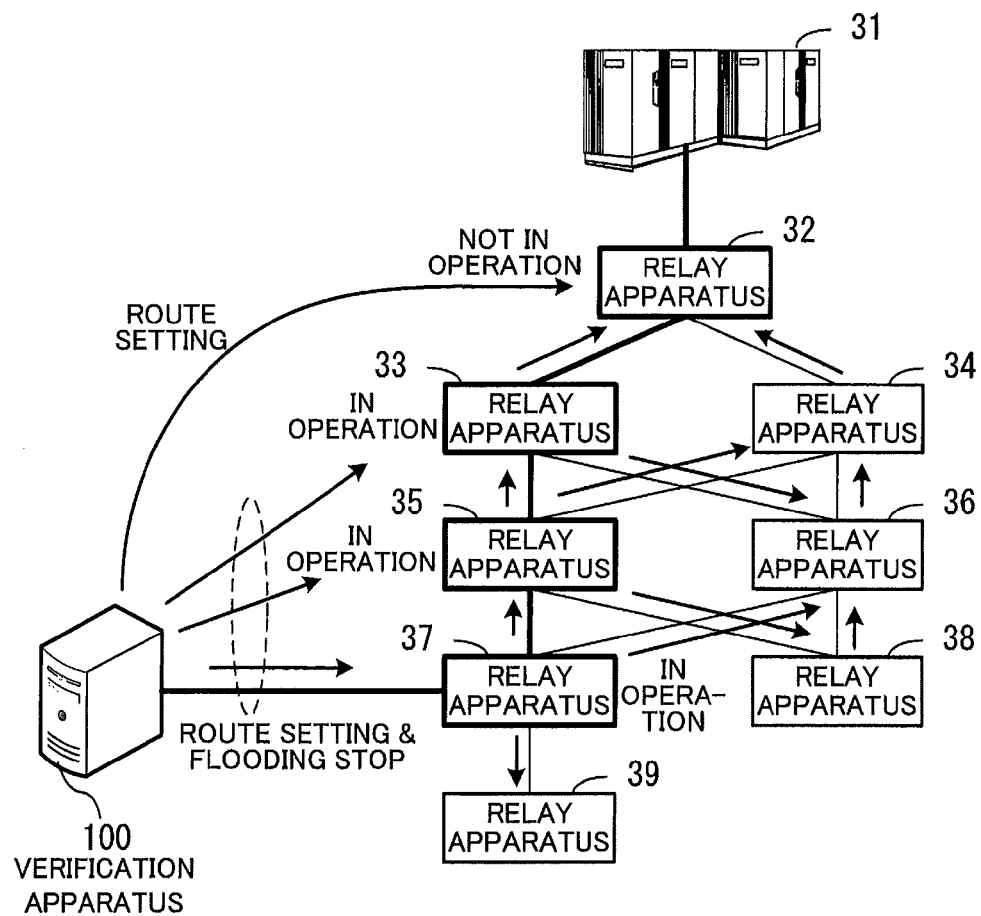
FIG. 21 illustrates an example of a situation in which delivery of route information is stopped.

FIG. 21 illustrates an example of a situation in which the delivery of route information is stopped. There are some cases where route information statically set for a relay apparatus is not allowed to be passed on through the verification-system network 30 by the dynamic route control algorithm. In such cases, the verification apparatus 100 prevents the statically set route information from being passed on by a flooding process under dynamic route control.

For example, first, it is determined whether the apparatus management information is collectable from relay apparatuses on the communication route between the verification apparatus 100 and the verification server 31. If the apparatus management information is collectable, the relay apparatuses on the communication route are classified, based on the apparatus management information, into those with dynamic route control being in operation and those with dynamic route control being not in operation.

In the example of FIG. 21, among the relay apparatuses 32, 33, 35, and 37 in the communication route between the verification apparatus 100 and the verification server 31, dynamic route control is in operation in the relay apparatuses 33, 35, and 37. In the relay apparatus 32, however, dynamic route control is not in operation. In this case, with respect to each of the relay apparatuses 33, 35, and 37 with dynamic route control being in operation, a static route setting regarding the address block selected from the pool address blocks is applied, and also a flooding stop setting is applied to prevent the route information statically set from being passed on by dynamic route control. With respect to the relay apparatus 32 with dynamic route control being not in operation, the static route setting regarding the selected address block is applied.

In this manner, even if dynamic route control is in operation in relay apparatuses to which static route settings are applied, the content of the static route settings is prevented from being dynamically passed on among the relay apparatuses. As a result, it is possible to prevent unstable communication caused by propagation of unnecessary route information.

Note that the apparatus management information may not be acquired from the relay apparatuses 32, 33, 35, and 37 in the communication route between the verification apparatus 100 and the verification server 31. In such a case, route information regarding the address block selected from the pool address blocks is statically set for the relay apparatuses 32, 33, 35, and 37 in the same manner as in the second embodiment. In addition, a flooding stop setting is also applied to the relay apparatuses 32, 33, 35, and 37 so as to prevent the statically set route information from being passed on to other relay apparatuses. Note that when the apparatus management information is not acquired from relay apparatuses, relay apparatuses with dynamic route control being in operation are identified, for example, by capturing packets.

In the above-described manner, it is possible to apply route settings to the relay apparatuses 32, 33, 35, and 37 in the communication route with reduced processing load, and also to prevent route information statically set from being passed on by dynamic route control to other relay apparatuses with dynamic route control being in operation.

(d) Other Embodiments

According to the second embodiment, a network tap is used to capture packets from the operating-system network 20, however, a different apparatus may be used instead. Other than the network tap, a L1 switch and a L2 switch are examples of network apparatuses having the function of directly transferring packets flowing in a network. Alternatively, packets may be captured by connecting the verification apparatus 100 to the operating-system network 20 and then using packet capture software. Note that the L1 switch is a network apparatus capable of switching signals in the physical layer (Layer 1). The L2 switch is a network apparatus for relaying packets in the data link layer (Layer 2). The L2 switch with port mirroring ability copies packets transferred through the L2 switch and outputs the copies from a predetermined port.

According to the second embodiment, the verification apparatus 100 acquires captured packets, however, a different apparatus may acquire the captured packets and then input them to the verification apparatus 100. For example, packets captured from the operating-system network 20 are stored, for example, in a file in the different apparatus. Then, when a performance test is executed, information of the packets stored in the file is input to the verification apparatus 100.

In addition, the processing functions described in each of the embodiments above may be achieved by a computer. In this case, a program is provided which describes processing content of the functions to be implemented by the information processing apparatus 1 or the verification server 100. By executing the program on the computer, the above-described processing functions are achieved on the computer. The program in which the processing content is described may be recorded on computer-readable recording media. Such computer-readable recording media include a magnetic storage device, an optical disk, a magneto-optical recording medium, and a semiconductor memory. Examples of the magnetic storage device are a HDD, a flexible disk (FD), and a magnetic tape. Examples of the optical disk are a DVD, a DVD-RAM, a CD-ROM, and a CD-RW. An example of the magneto-optical recording medium is a magneto-optical disk (MO).

To distribute the program, for example, portable recording media, such as DVDs and CD-ROMs, on which the program is recorded are sold. In addition, the program may be stored in a memory device of a server computer and then transferred from the server computer to another computer via a network.

A computer for executing the program stores, for example, in its own memory device, the program which is originally recorded on a portable recording medium or transferred from the server computer. Subsequently, the computer reads the program from its own memory device and performs processing according to the program. Note that the computer is able to read the program directly from the portable recording medium and perform processing according to the program. In addition, the computer is able to sequentially perform processing according to a received program each time such a program is transferred from a server computer.

In addition, at least part of the above-described processing functions may be achieved by an electronic circuit, such as a digital signal processor (DSP), an application specific integrated circuit (ASIC), and a programmable logic device (PLD).

According to one aspect, the workload involved in route settings for relay apparatuses is reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a process comprising:
   determining an address available to be set as a source address of a first packet to be transmitted to an apparatus included in a first network;
   identifying one or more relay apparatuses in a communication route from the apparatus to the computer;
   configuring, for at least one of the identified relay apparatuses, a setting regarding a transfer destination of a second packet whose destination address is the determined address in such a manner that the second packet is transferred toward the computer along the communication route;
   capturing a packet from a second network;
   converting a source address of the captured packet to the determined address and a destination address of the captured packet to an address of the apparatus; and
   transmitting the captured packet having the converted source and destination addresses to the apparatus in the first network,
   wherein the configuring includes:
   determining whether a function carried by each of the identified relay apparatuses is in operation, the function being for exchanging, with different relay apparatuses, route information indicating the transfer destination of the second packet and updating the route information of said each of the identified relay apparatuses, and
   configuring the setting for one of the identified relay apparatuses when the function is determined to be in operation in all of the identified relay apparatuses.

2. The non-transitory computer-readable storage medium according to claim 1, wherein:
   the determining includes determining a plurality of addresses assembled into an address block as addresses available to be set as source addresses of first packets to be transmitted to the apparatus; and
   the configuring includes configuring a setting regarding a transfer destination of second packets each having a destination address corresponding to one of the addresses included in the address block in such a manner that the second packets are transferred toward the computer along the communication route.

3. The non-transitory computer-readable storage medium according to claim 1, wherein:
   the configuring includes causing each of the identified relay apparatuses for which the setting has been configured to stop a function thereof for exchanging, with different relay apparatuses, route information indicating the transfer destination of the second packet and updating the route information of said each of the identified relay apparatuses.

4. The non-transitory computer-readable storage medium according to claim 1, wherein the process further includes:
   receiving a packet returned from the apparatus in response to the packet transmitted to the apparatus, and
   evaluating performance of the apparatus based on the received packet.

5. The non-transitory computer-readable storage medium according to claim 1, wherein the converting of the source address is performed substantially simultaneously with the converting of the destination address.

6. A non-transitory computer-readable storage medium storing a computer program that causes a computer to perform a process comprising:
- determining an address available to be set as a source address of a first packet to be transmitted to an apparatus included in a first network;
- identifying one or more relay apparatuses in a communication route from the apparatus to the computer;
- configuring, for at least one of the identified relay apparatuses, a setting regarding a transfer destination of a second packet whose destination address is the determined address in such a manner that the second packet is transferred toward the computer along the communication route;
- capturing a packet from a second network;
- converting a source address of the captured packet to the determined address and a destination address of the captured packet to an address of the apparatus; and
- transmitting the captured packet having the converted source and destination addresses to the apparatus in the first network,
- wherein the configuring includes:
- determining whether a function carried by each of the identified relay apparatuses is in operation, the function being for exchanging, with different relay apparatuses, route information indicating the transfer destination of the second packet and updating the route information of said each of the identified relay apparatuses, and
- configuring, when the function is determined to be in operation in some of the identified relay apparatuses, the setting individually for one of the some relay apparatuses and all of relay apparatuses with the function being not in operation.

7. An information processing apparatus, comprising:
a memory; and
a processor coupled to the memory, the processor configured to perform a process including:
- determining an address available to be set as a source address of a first packet to be transmitted to an apparatus included in a first network;
- identifying one or more relay apparatuses in a communication route from the apparatus to the information processing apparatus;
- configuring, for at least one of the identified relay apparatuses, a setting regarding a transfer destination of a second packet whose destination address is the determined address in such a manner that the second packet is transferred toward the information processing apparatus along the communication route;
- capturing a packet from a second network and storing the captured packet in the memory;
- converting a source address of the captured packet to the determined address and a destination address of the captured packet to an address of the apparatus; and
- transmitting the captured packet having the converted source and destination addresses to the apparatus in the first network,
- wherein the configuring includes:
- determining whether a function carried by each of the identified relay apparatuses is in operation, the function being for exchanging, with different relay apparatuses, route information indicating the transfer destination of the second packet and updating the route information of said each of the identified relay apparatuses, and
- configuring the setting for one of the identified relay apparatuses when the function is determined to be in operation in all of the identified relay apparatuses.

8. A route setting method comprising:
- determining, by a processor, an address available to be set as a source address of a first packet to be transmitted to an apparatus included in a first network;
- identifying, by the processor, relay apparatuses in a communication route from the apparatus to a computer;
- configuring, by the processor, a setting regarding a transfer destination of a second packet whose destination address is the determined address for at least one of the identified relay apparatuses in such a manner that the second packet is transferred toward the computer along the communication route;
- capturing, by the processor, a packet from a second network;
- converting, by the processor, a source address of the captured packet to the determined address and a destination address of the captured packet to an address of the apparatus; and
- transmitting, by the processor, the captured packet having the converted source and destination addresses to the apparatus in the first network,
- wherein the configuring includes:
- determining, by the processor, whether a function carried by each of the identified relay apparatuses is in operation, the function being for exchanging, with different relay apparatuses, route information indicating the transfer destination of the second packet and updating the route information of said each of the identified relay apparatuses, and
- configuring, by the processor, the setting for one of the identified relay apparatuses when the function is determined to be in operation in all of the identified relay apparatuses.

9. The non-transitory computer-readable storage medium according to claim 1, wherein the second packet is a reply packet issued from the apparatus in response to a packet transmitted from the computer to the apparatus.

* * * * *